US010648890B2

(12) United States Patent
Takahashi et al.

(10) Patent No.: US 10,648,890 B2
(45) Date of Patent: May 12, 2020

(54) VEHICLE RESTRAINING DEVICE

(71) Applicant: MEIDENSHA CORPORATION, Tokyo (JP)

(72) Inventors: Toshimichi Takahashi, Ota (JP); Masao Furusawa, Kyoto (JP)

(73) Assignee: MEIDENSHA CORPORATION, Tokyo (JP)

( * ) Notice: Subject to any disclaimer, the term of this patent is extended or adjusted under 35 U.S.C. 154(b) by 490 days.

(21) Appl. No.: 15/103,602

(22) PCT Filed: Dec. 4, 2014

(86) PCT No.: PCT/JP2014/082090
§ 371 (c)(1),
(2) Date: Jun. 10, 2016

(87) PCT Pub. No.: WO2015/087769
PCT Pub. Date: Jun. 18, 2015

(65) Prior Publication Data
US 2016/0313214 A1    Oct. 27, 2016

(30) Foreign Application Priority Data

Dec. 11, 2013  (JP) ................................. 2013-255555
Jun. 17, 2014  (JP) ................................. 2014-124136
(Continued)

(51) Int. Cl.
*G01M 17/007*   (2006.01)
*G01M 9/06*     (2006.01)

(52) U.S. Cl.
CPC ........ *G01M 17/0074* (2013.01); *G01M 9/062* (2013.01); *G01M 17/007* (2013.01); *G01M 17/0072* (2013.01)

(58) Field of Classification Search
CPC ...... G01M 17/00; G01M 17/007; G01M 9/06; G01M 17/0072; G01M 9/04;
(Continued)

(56) References Cited

U.S. PATENT DOCUMENTS 2,805,860 A * 9/1957 Littig ..................... A63B 69/16
                                               211/22
3,404,636 A * 10/1968 Kavieff .................. B61B 10/02
                                               104/172.4
(Continued)

FOREIGN PATENT DOCUMENTS

CN     102016537 A       4/2011
DE     102013224548   *  6/2015
(Continued)

OTHER PUBLICATIONS

Meiden CE73-2378 Dynamometer Systems; Jul. 2013.*
(Continued)

*Primary Examiner* — Monica S Carter
*Assistant Examiner* — Mahdi H Nejad
(74) *Attorney, Agent, or Firm* — Foley & Lardner LLP

(57) ABSTRACT

A vehicle restraint apparatus is for restraining a vehicle 1 on one or more rollers 7 of a vehicle test system. The vehicle restraint apparatus 11 includes a vehicle restraining jig 12 to connect the vehicle 1 with a pole 10 on a floor 9, and a deflection absorbing mechanism 90 to absorb deflection of the vehicle restraining jig 12 produced at the time of vehicle test with the vehicle test system.

35 Claims, 31 Drawing Sheets

(30) Foreign Application Priority Data

| Jun. 17, 2014 | (JP) | 2014-124137 |
|---|---|---|
| Oct. 3, 2014 | (JP) | 2014-205048 |
| Oct. 3, 2014 | (JP) | 2014-205049 |
| Oct. 3, 2014 | (JP) | 2014-205050 |
| Oct. 3, 2014 | (JP) | 2014-205051 |

(58) Field of Classification Search
CPC .... G01M 17/0074; G01M 9/062; F16F 7/104; F04B 39/00
USPC ........................................ 73/116.01, 117.01
See application file for complete search history.

(56) References Cited

U.S. PATENT DOCUMENTS

| 4,798,088 | A | * | 1/1989 | Haeg | G01M 17/0074 248/634 |
|---|---|---|---|---|---|
| 4,925,183 | A | * | 5/1990 | Kim | A63B 22/16 434/61 |
| 5,003,819 | A | * | 4/1991 | Koopmann | G01M 17/022 73/146 |
| 5,111,685 | A | | 5/1992 | Langer | |
| 5,492,516 | A | * | 2/1996 | Trotter | A63B 21/22 482/57 |
| 5,756,889 | A | * | 5/1998 | D'Angelo | G01M 17/0074 73/116.08 |
| 6,427,528 | B1 | | 8/2002 | Yamakado et al. | |
| 6,793,609 | B1 | * | 9/2004 | Fan | A63B 21/00196 482/57 |
| 6,810,726 | B2 | | 11/2004 | Mogi et al. | |
| 8,186,207 | B2 | | 5/2012 | Litz | |
| 8,788,116 | B2 | | 7/2014 | Litz | |
| 9,752,961 | B2 | * | 9/2017 | Barnes | G01M 17/0072 |
| 9,855,480 | B2 | * | 1/2018 | Kalogiros | A63B 69/16 |
| 2003/0109992 | A1 | * | 6/2003 | Horiuchi | G01M 7/00 702/56 |
| 2007/0261499 | A1 | * | 11/2007 | Hamilton | G01M 7/00 73/798 |
| 2008/0087104 | A1 | * | 4/2008 | Matsumoto | G01M 17/0072 73/862.55 |
| 2009/0133484 | A1 | * | 5/2009 | Inoue | G01M 17/0074 73/117.01 |
| 2009/0217746 | A1 | | 9/2009 | Litz | |
| 2009/0217775 | A1 | * | 9/2009 | Litz | G01M 9/062 73/862.391 |
| 2011/0277560 | A1 | * | 11/2011 | Barnett | G01L 5/161 73/862.045 |
| 2013/0339892 | A1 | * | 12/2013 | Watanabe | G01M 17/0072 715/771 |
| 2015/0000392 | A1 | * | 1/2015 | Knestel | G01M 9/04 73/147 |
| 2016/0052414 | A1 | * | 2/2016 | Bell | G01M 17/007 320/108 |
| 2016/0313213 | A1 | * | 10/2016 | Takahashi | G01M 17/0074 |
| 2017/0191902 | A1 | | 7/2017 | Komada et al. | |
| 2018/0045601 | A1 | * | 2/2018 | Hartmann | G01M 9/062 |

FOREIGN PATENT DOCUMENTS

| JP | 62-189638 | U | | 12/1987 |
|---|---|---|---|---|
| JP | 64-83743 | A | | 3/1989 |
| JP | 1-167642 | U | | 11/1989 |
| JP | 1-279131 | A | | 11/1989 |
| JP | 2-118849 | U | | 9/1990 |
| JP | 04-025641 | A | | 1/1992 |
| JP | 5-503152 | A | | 5/1993 |
| JP | 06-351139 | A | | 12/1994 |
| JP | 08-043264 | A | | 2/1996 |
| JP | 09-304237 | A | | 11/1997 |
| JP | 10-67376 | A | | 3/1998 |
| JP | 10-307082 | A | | 11/1998 |
| JP | H10307082 | A | * | 11/1998 |
| JP | 11-132282 | A | | 5/1999 |
| JP | 2001-080583 | A | | 3/2001 |
| JP | 2002-131189 | A | | 5/2002 |
| JP | 2005-106701 | A | | 4/2005 |
| JP | 2005106701 | | * | 4/2005 |
| JP | 2007-170635 | A | | 7/2007 |
| JP | 2007170635 | | * | 7/2007 |
| JP | 2007170635 | A | * | 7/2007 |
| JP | 2007-212154 | A | | 8/2007 |
| JP | 2007212154 | | * | 8/2007 |
| JP | 2009-133750 | A | | 6/2009 |
| JP | 2009-186239 | A | | 8/2009 |
| JP | 2009271025 | | * | 11/2009 |
| JP | 2010-096212 | A | | 4/2010 |
| JP | 2010096212 | A | * | 4/2010 |
| JP | 2011-033517 | A | | 2/2011 |
| JP | 2011-513746 | A | | 4/2011 |
| JP | 2013-156232 | A | | 8/2013 |
| JP | 2013156232 | A | * | 8/2013 |

OTHER PUBLICATIONS

Vehicle Restraint System _ Bennett Engineering.*
Chinese Office Action, dated Dec. 1, 2017, 16 pages.
U.S. Appl. No. 15/103,548, filed Jun. 10, 2016, Meidensha Corporation.
Japanese Office Action dated Sep. 1, 2015, 3 pages.
USPTO Office Action U.S. Appl. No. 15/103,602, dated Mar. 8, 2019, 18 pages.
USPTO Final Office Action, U.S. Appl. No. 15/103,548, dated Aug. 9, 2019, 23 pages.

* cited by examiner (A)

(B)

(C)

(A)

(B)

(A)

(B)

(C)

(A)

(B)

(A)

(B)

(A)

(B)

(A)

(B)

(A)

(B)

(A)

(B)

(A)

(B)

(C)

(A)

(B)

(A)

(B)

(C)

(A)

(B)

(A)

(B)

(A)

(B)

(A)

(B)

(A)

(B)

(A)

(B)

(A)

(B)

(A)

(B)

VEHICLE RESTRAINING DEVICE

TECHNICAL FIELD

The present invention relates to a vehicle restraint apparatus or vehicle restraining device for restraining or binding a vehicle in a vehicle test system such as a chassis dynamometer performing tests for fuel consumption, exhaust gases etc. of the vehicle mounted on one or more rollers.

BACKGROUND ART

A vehicle restraining apparatus of a type as shown in FIG. 33 is arranged to restrain a vehicle 102 having tires 102a on rollers 106 of chassis dynamometer 105 by using chains or wire ropes 101 so that first ends 101a of wire ropes 101 are connected with vehicle 102 and second or opposite ends 101b of wire ropes 10a are connected with poles 104 installed on a floor 103 (Patent documents 1, 2, for example).

Moreover, a vehicle restraining device 112 as shown in FIGS. 34(A) and 34(B) is under development. This vehicle restraining device 112 is arranged to slide along a rail 111, and to restrain a vehicle 116 with arm 114 which is supported by a arm support portion 113 of the vehicle restraining device 112, and which extends to a forward end portion provided with an adapter 115 fit in an adapter receiving portion 118 formed in a chassis 117 of the vehicle 116 to connect and restrain the vehicle (Patent Document 3, for example).

In a vehicle running on an actual road, the vertical load applied to each tire varies in dependence on the acceleration/deceleration. In the case of the chassis dynamometer, by contrast, each degree of freedom of the vehicle is restrained and hence
the vertical loads vary differently from the running condition on the actual road.

Between the running motion on the actual road and the running motion on the chassis dynamometer, the difference in the vehicle pitching motion causes a difference in the application of vertical loads, and exerts influence on the results of a test. Since the accuracy of the vehicle performance test is adversely influenced by the difference in changes in the vertical loads, it is required to reproduce the behavior of vehicle pitching motion.

In the case of the vehicle restraining apparatus using the chains or wire ropes 101 as shown in FIG. 33, the tires 102a of vehicle 102 are pressed on the rollers 106 by the chains or wire ropes 101, and therefore, the reproduction of the behavior of vehicle pitching motion is difficult.

The vehicle restraining apparatus of Patent document 3 is arranged to restrain the vehicle with the vehicle restraining device 112 which is movable on the rail 111 and which includes the adapter 115 inserted in the adapter receiving portion 118 formed in the chassis 117 of vehicle 116. Therefore, the reproduction of the vehicle pitching behavior is easier because the tires are not pressed on the rollers by the chains or wire ropes 101 as in Patent Documents 1 and 2. However, the vehicle restraining apparatus of Patent Document 3 encounters the following problems.

(1) The adapter receiving portion is generally formed in a side sill in the bottom of the vehicle, so that the application is difficult to vehicles having no side sills. For vehicles having no side sills, it is required to fix an attachment formed with the adapter receiving portion, to the bottom of the vehicle.

(2) The adapter receiving portion is required to be rigid enough for safety aspect. However, the side sills are not always rigid enough in the whole of the vehicle.

(3) The positions of side sills are away from the center of gravity of the vehicle, and the center of gravity of the vehicle is not restrained. Therefore, the vehicle pitching motion is varied differently from the actual behavior on the road.

The present invention has been devised to solve these problems.

PRIOR ART DOCUMENTS

Patent Documents

Patent Document 1: JPH10-307082A
Patent Document 2: JP2007-212154A
Patent Document 3: JP2011-033517A (cf. paragraph [0002] ~paragraph [0005] and FIGS. 6 and 7)
Patent Document 4: JPH01-279131A
Patent Document 5: JPH10-67376A
Patent Document 6: JPS64-83743A
Patent Document 7: JP2001-80583A
Patent Document 8: JPH02-118849U
Patent Document 9: JPH01-167642U

SUMMARY OF THE INVENTION

According to the present invention, a vehicle restraint apparatus comprises a vehicle restraining jig to connect a vehicle on roller(s) of a vehicle test system, with a pole on a floor, and a deflection absorbing mechanism to absorb deflection of the vehicle restraining jig produced at a time of a vehicle test with the vehicle test system.

According to the present invention, the vehicle restraint apparatus can absorb deflection and shock of the vehicle restraining jig at the time of test of vehicle, and improve the accuracy and reliability of the test.

The deflection absorbing mechanism may comprise a jig receiving section including a buffer to abut elastically on the vehicle restraining jig when the vehicle restraining jig is deflected or bent, and a prop section or support section supporting the jig receiving section. The jig receiving portion may be supported so that the jig receiving portion is rotatable about a vertical axis or about a horizontal axis. The buffer may include a surface which faces upward toward the vehicle restraining jig and which is arranged to abut elastically against the vehicle restraining jig from a lower side of the vehicle restraining jig when the vehicle restraining jig sags down at the time of the test. The buffer may be arranged to abut against the vehicle restraining jig from a lateral (left or right) side of the vehicle restraining jig when the vehicle restraining jig moves laterally at the time of the test.

MODE(S) FOR CARRYING OUT THE INVENTION

Before explanation on a vehicle restraint apparatus according to the present invention, explanation is briefly directed to a vehicle using the vehicle restraint apparatus or device according to the present invention.

Figure 1:
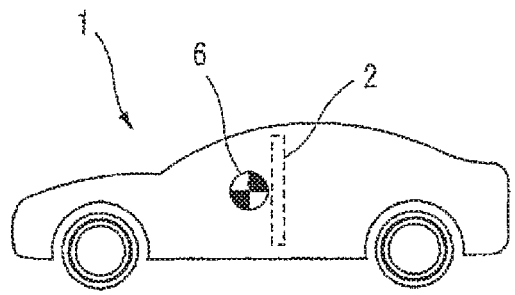
FIG. 1(A) is a schematic side view showing seatbelt fixing pillars of a vehicle.
FIG. 1(B) is a schematic plan view showing the pillars.
FIG. 1(C) is an enlarged view showing a main portion of one of the pillars.
Figure 1:
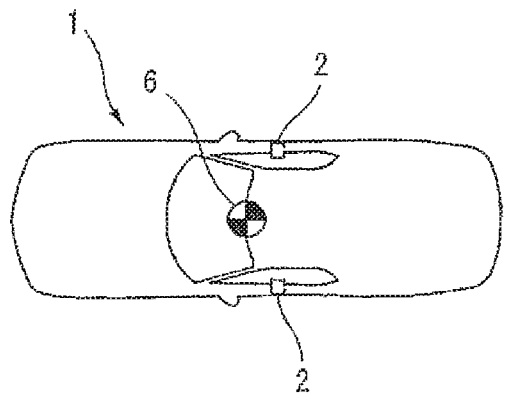
Figure 1:
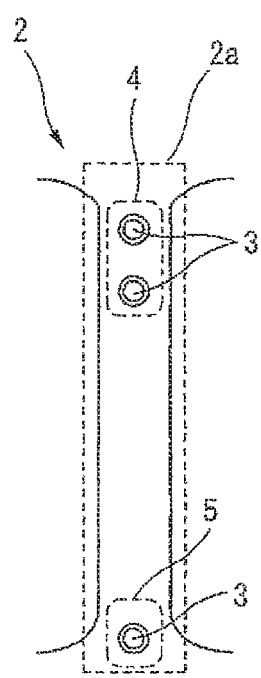

FIGS. 1(A) and 1(B) are schematic side view and schematic plan view of a vehicle 1 using the vehicle restraint apparatus according to the present invention.

The vehicle 1 includes seatbelt fixing pillars 2 at the side of doors, respectively. Each seatbelt fixing pillar 2 is a pillar to which a seatbelt is attached or anchored.

As shown in FIG. 1(C), upper and lower seatbelt fixing portions 4 and 5 are fastened to upper and lower end portions of the seatbelt fixing pillar 2 by a plurality of screw fasteners 3. Upper and lower ends of the seatbelt are attached to the upper and lower seatbelt fixing portions 4 and 5, respectively. In FIGS. 1(A) and 1(B), a reference numeral 6 represents the position of center of gravity of the vehicle.

[First Embodiment]

FIGS. 2(A) and 2(B) are schematic side view and schematic plan view of a vehicle 1 held by using a vehicle restraint apparatus or device 11 according to a first embodiment.

The vehicle restraint apparatus 11 includes a pair of vehicle restraining jigs or tools 12, 12 each of which includes a first end joined with one of the left and right seatbelt fixing pillars 2 of the vehicle 1 having tires 8 mounted on rollers 7 of a chassis dynamometer, and a second end joined with one of left and right poles 10 standing on a floor 9.

Vehicle restraining jigs 12, 12 are made of material having tensile strength and compression strength required for restraining longitudinal movement or forward/rearward movement of the vehicle, such as plate, sheet or pipe of steel or other material having a superior mechanical strength. Each of vehicle restraining jigs 12, 12 is provided with a length adjusting mechanism 13, such as a turnbuckle, capable of adjusting the length of the jig in accordance with the vehicle length, at a position near one end of the jig. A tie rod 14 connecting the left and right vehicle restraining jigs 12, 12 is provided in a central portion in the lengthwise direction of the jigs. Tie rod 14 is provided with a length adjusting mechanism 15, such as a turnbuckle, for adjusting the spacing between the vehicle restraining jigs 12, 12 in accordance with the vehicle width, at a central portion in the lengthwise direction of the tie rod.

The first ends, in the lengthwise direction, of vehicle restraining jigs 12, 12 are, respectively, joined rotatably to the seatbelt fixing pillars 2 through a first link mechanism 16. The second ends, in the lengthwise direction, of vehicle restraining jigs 12, 12 are, respectively, joined rotatably to the poles 10 through a second link mechanism 17.

As shown in FIG. 2(A), the first link mechanism 16 is attached to an inside surface 2*a* of the seatbelt fixing pillar 2 on each side so that a shaft 18 is located at a position in the vicinity of the vehicle center of gravity 6. A shaft 21 of the second link member 17 is attached to the pole 10 on each side at a position approximately equal in height to the vehicle center of gravity 6. The position in the vicinity of the vehicle center of gravity 6 is a position set as close as possible to the vehicle center of gravity 6.

Figure 3:
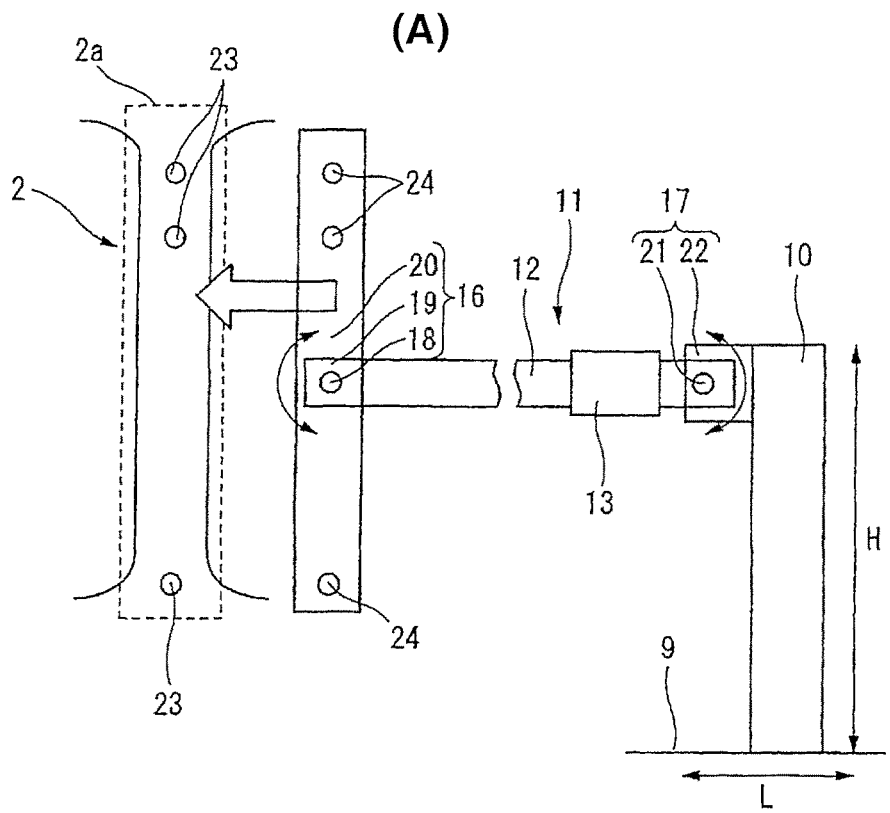
FIGS. 3(A), 3(B) and 3(C) are views for illustrating one example of a mode of attaching the vehicle restraining jigs to the seatbelt fixing pillars in the first embodiment.
Figure 3:
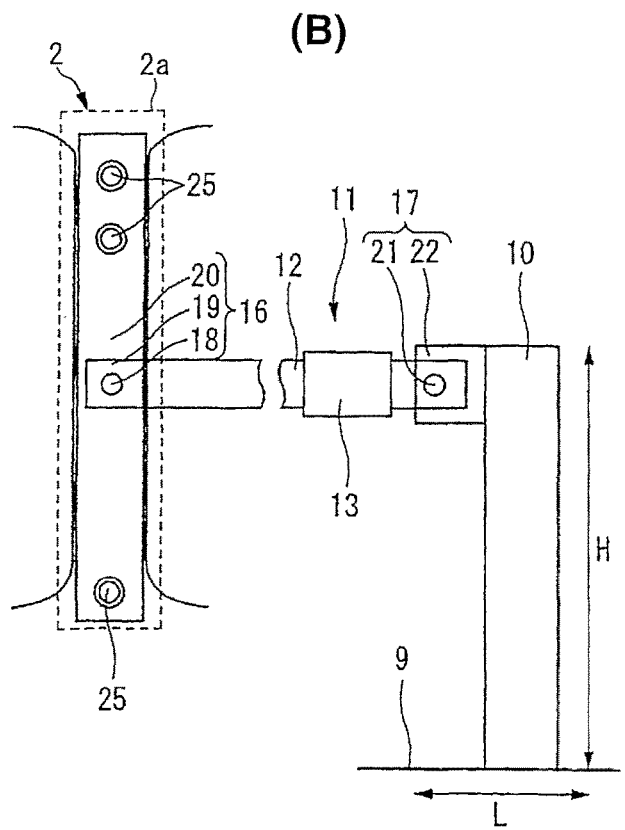
Figure 3:
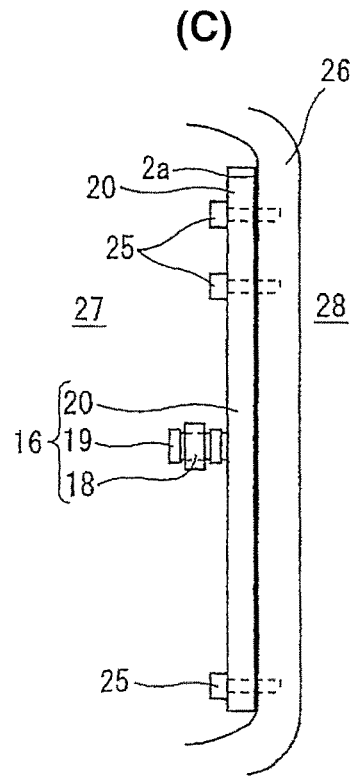

As shown in FIG. 3, the first link mechanism 16 includes the shafts 18, bearing members or shaft receiving members 19, respectively, supporting the shafts 18 rotatably, and attaching member (hereinafter referred to as pillar mount member) 20 for attaching the bearing members 19 to the inside surfaces 2*a* of seatbelt fixing pillars 2.

The first link mechanism 16 connects the first ends, in the lengthwise direction, of vehicle restraining jigs 12, 12, rotatably to the inside surfaces 2*a* of seatbelt fixing pillars 2, with the shafts 18, bearing members 19 and pillar mount members 20.

The pillar mount members 20 are formed in the shape of a long plate conforming to the seatbelt fixing pillars 2 and attached or fixed to the inside surfaces 2*a* of seatbelt fixing pillars 2 in place of the seatbelt fixing portions 4 and 5.

The second link mechanism 17 includes the shafts 21 disposed, respectively, at the second ends of the vehicle straining jigs 12 and bearing members or shaft receiving members 22. The vehicle restraining jigs are attached to the poles 10 through the bearing members 22, respectively.

One example of the method of fixing the vehicle restraining jigs 12 to the seatbelt fixing pillars 2 is explained with reference to FIGS. 3(A), 3(B) and 3(C).

In this example, first, the first end of each of left and right vehicle restraining jigs 12, 12 is attached to the central portion of pillar mount member 20 through the shaft 18 and the bearing member 19, as shown in FIG. 3(A). On the other hand, the seatbelt fixing portions 4, 5 are removed from the seatbelt fixing pillar 2.

Then, as shown in FIGS. 3(B) and 3(C), the pillar mount member 20 is fastened to the inside surface 2*a* of seatbelt fixing pillar 2 on each side. This operation of fixing the pillar mount member 20 to seatbelt fixing pillar 2 is performed by superimposing threaded holes 24 of pillar mount member 20 on threaded holes 23 of seatbelt fixing pillar 2 and screwing screw fasteners 25 into the superimposed holes 23, 24. In FIG. 3(C), a reference numeral 26 represents a frame of the vehicle, a reference numeral 27 represents the interior of the vehicle, and a reference numeral 28 represents the exterior of the vehicle.

Figure 2:
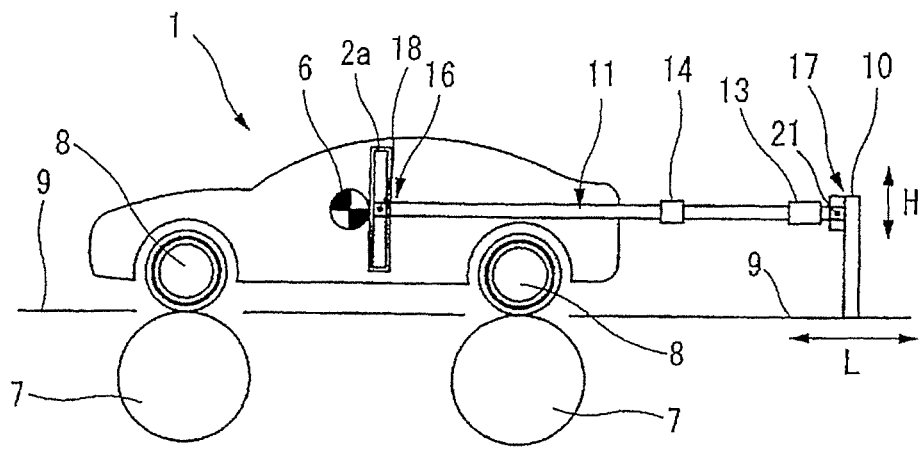
FIGS. 2(A) and 2(B) are schematic side view and schematic plan view of a vehicle restraint apparatus according to a first embodiment of the present invention, provided with a test vehicle.
Figure 2:
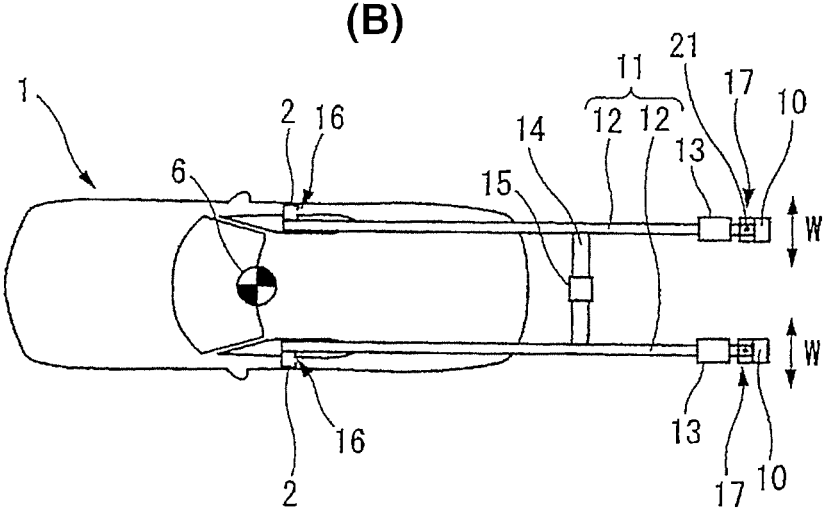

At the time of usage of the thus-constructed vehicle restraint apparatus 11 of the first embodiment, first the vehicle 1 is mounted on the rollers 7 of the chassis dynamometer as shown in FIG. 2, the first ends of vehicle restraining jigs 12 are linked with the seatbelt fixing pillars 2, respectively, through the first link mechanism 16, and the shafts 16 of first link mechanism 16 are positioned in the vicinity of the center of gravity 6 of the vehicle. On the other hand, the second ends of vehicle restraining jigs 12 are attached to the poles 10 through second link mechanism 17, and the shafts 21 of second link mechanism 17 are set at positions whose heights are substantially equal to the height of vehicle center of gravity 6 by adjusting the heights of poles 10, so that the vehicle restraining jigs 12 are held substantially horizontal.

Then, vehicle 1 is restrained by left and right vehicle restraining jigs 12, the rollers 7 are rotated and various test of vehicle 1 are performed.

The first ends of vehicle restraining jigs 12 are connected with the seatbelt fixing pillars 2 having a high rigidity. Therefore, the vehicle restraint apparatus can hold or restrain the vehicle firmly and securely with the vehicle restraining jigs 12.

Furthermore, because of the structure joining the first ends of vehicle restraining jigs 12 rotatably through first link mechanism 16 to the seatbelt fixing pillars 2 in the vicinity of vehicle center of gravity 6 and joining the second ends of vehicle restraining jigs 12 rotatably through second link mechanism 17 to the poles 10 at the heights substantially equal to the height of center of gravity 6, the vehicle (translational) longitudinal motion is restrained but the vehicle (rotational) pitching motion and the vehicle (translational) vertical motion are left free. Therefore, this structure enables the realization of vehicle behavior similar to the vertical or normal load on an actual road. Since the vertical load applied to each tire is matched to the traveling state including the accelerating and decelerating states, this vehicle restraint apparatus enables the tests including test of fuel consumption by mode operations, exhaust gas test and vehicle performance test.

Moreover, it is possible to adjust the length of each vehicle restraining jig 12 in dependence on the length of the vehicle 1, with the length adjusting mechanism 13 capable of adjusting the length of the vehicle restraining jig 12.

The positions of poles 10 are adjustable in at least one of the vehicle width direction and the vehicle length direction. Therefore, the vehicle restraint apparatus is applicable to vehicles of a variety of sizes, by adjusting the vehicle restraining jigs 12 in accordance with the width, length etc. of the vehicle 1.

[Second Embodiment]

Figure 4:
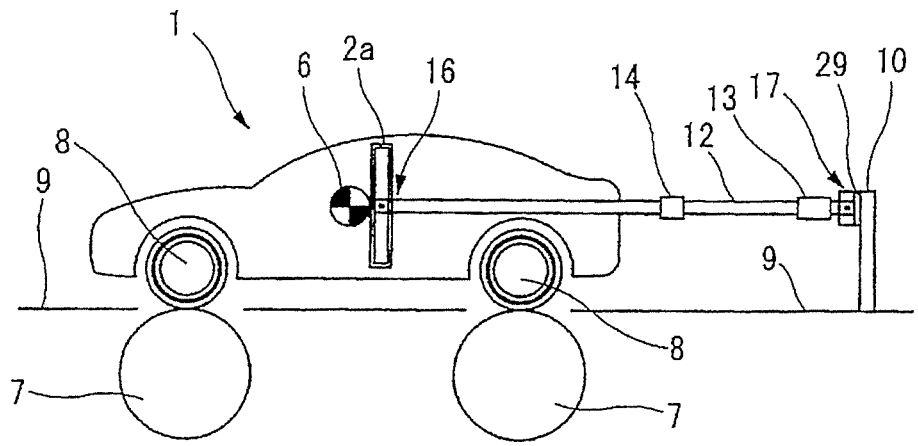
FIGS. 4(A) and 4(B) are schematic side view and schematic plan view of a vehicle restraint apparatus according to a second embodiment of the present invention, provided with a test vehicle.
Figure 4:
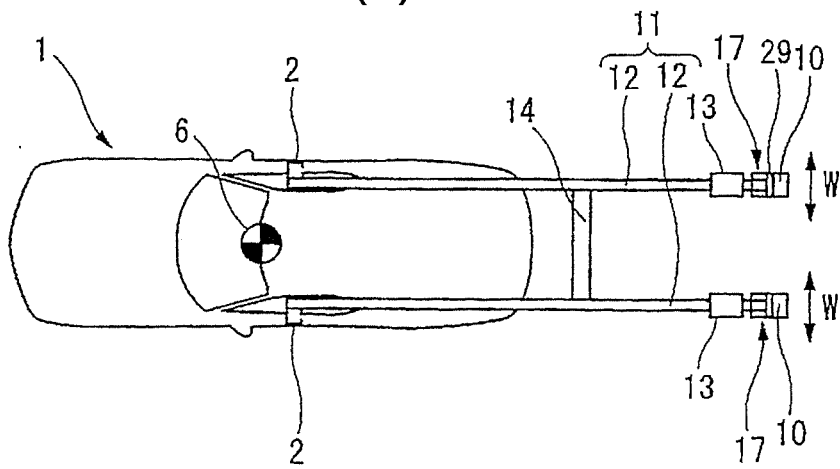

FIG. 4 shows a second embodiment. In this embodiment, there is provided, between the second link mechanism 17 and poles 10 in the mode of the first embodiment, one or more restraining force sensors 29 which are arranged to sense a restraining force of the vehicle. The positions of restraining force sensors 29 are not limited to the region between second link mechanism 17 and poles 10. Restraining force sensors 29 may be provided at positions between vehicle restraining jigs 12 and second link mechanism 17, positions between first link mechanism 16 and seatbelt fixing pillars 2, or some other positions capable of securely sensing the restraining force of restraining vehicle 1. The vehicle restraint apparatus 11 of this embodiment capable of sensing the vehicle restraining force makes it possible to measure, analyze and evaluate the vehicle sprung characteristics, in addition to the effects of the first embodiment.

[Third Embodiment]

Figure 5:
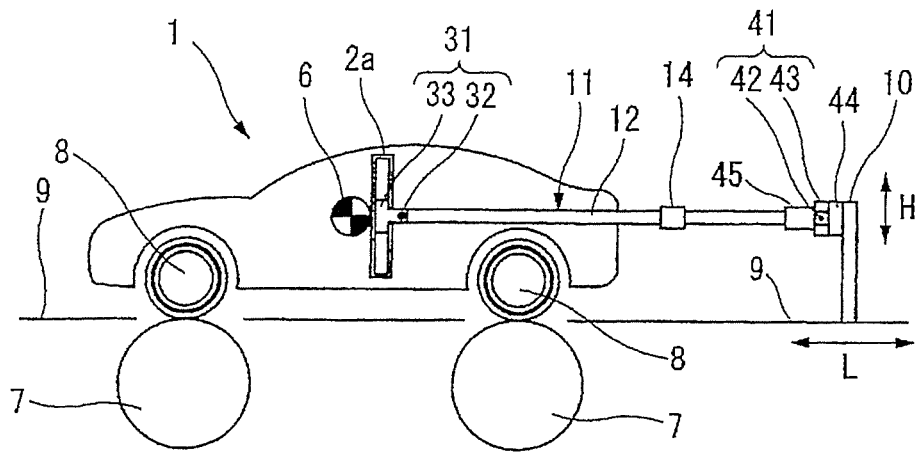
FIGS. 5(A) and 5(B) are schematic side view and schematic plan view of a vehicle restraint apparatus according to a third embodiment of the present invention, provided with a test vehicle.
Figure 5:
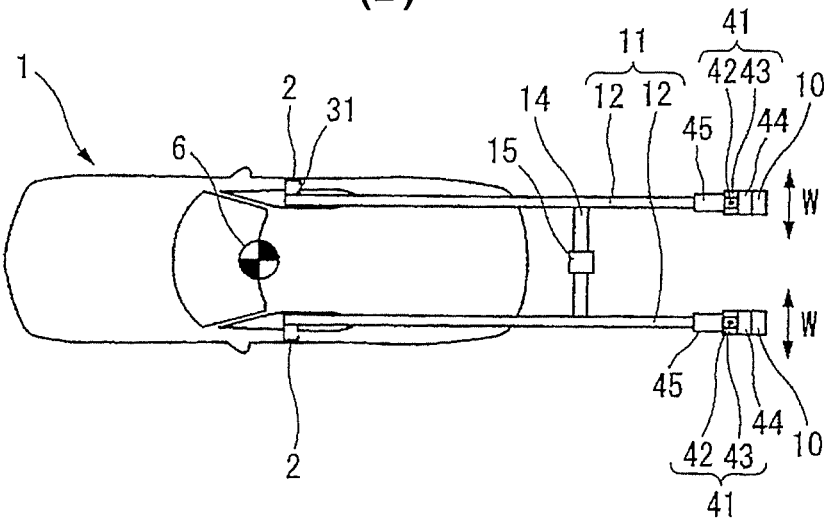

FIGS. 5~9 show a third embodiment. In this embodiment, as shown in FIG. 5, a first link mechanism 31 joining the first ends of vehicle restraining jigs 12 rotatably with the seatbelt fixing pillars 2 includes tubular shaft portions 32 to which the first ends of vehicle restraining jigs 12 are, respectively, attached rotatably, and shaft supporting arms 33 attaching the shaft portions 32 to the seatbelt fixing pillars 2, respectively.

Figure 6:
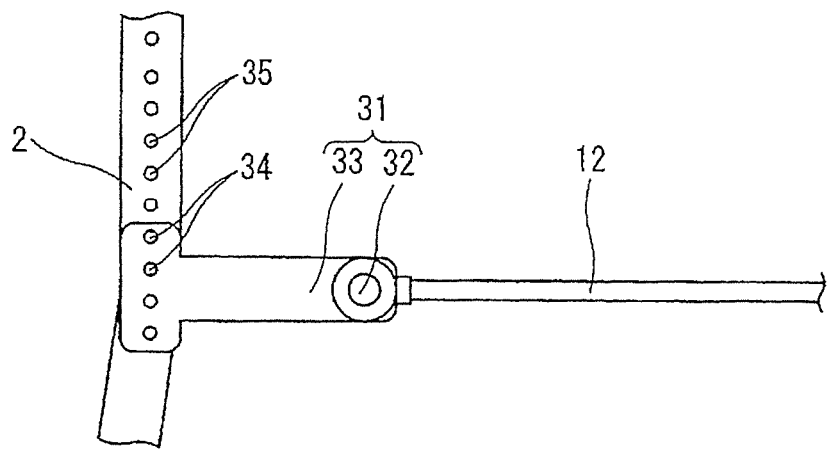
FIG. 6 is a side view of a first link mechanism according to the third embodiment.
Figure 7:
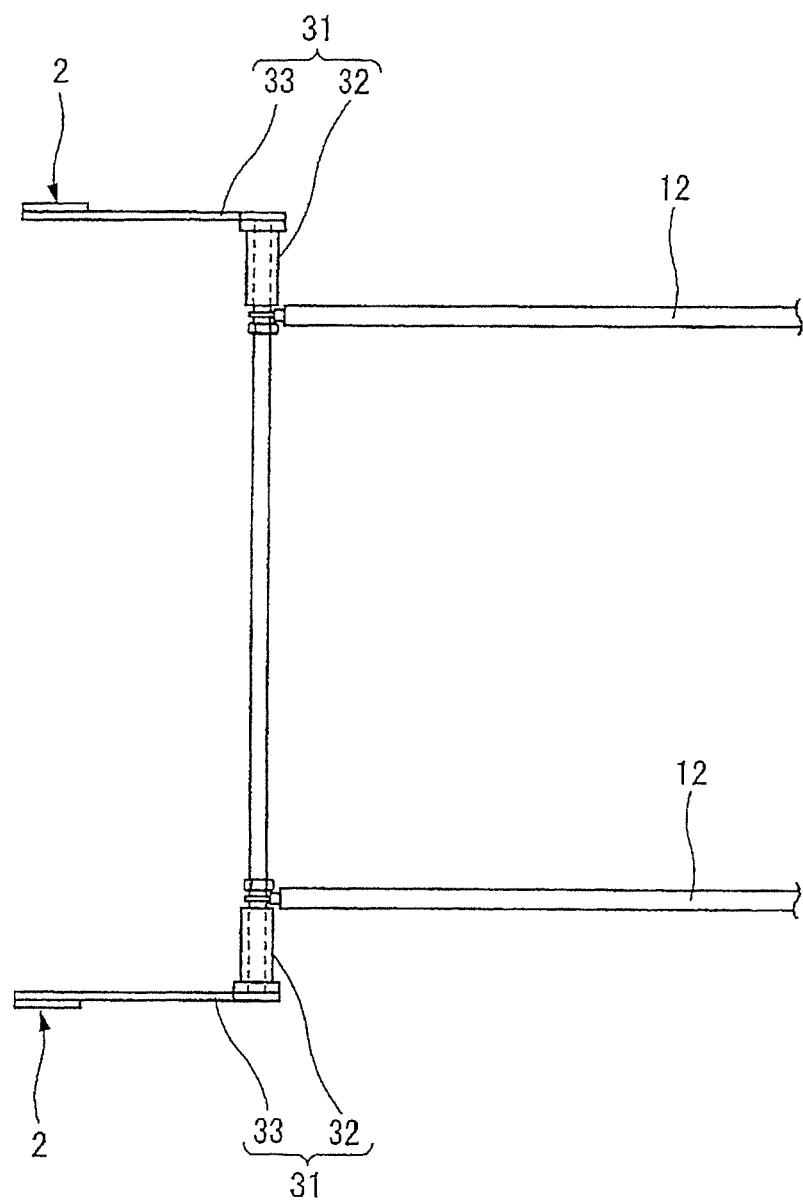
FIG. 7 is a plan view of the first link mechanism according to the third embodiment.
Figure 8:
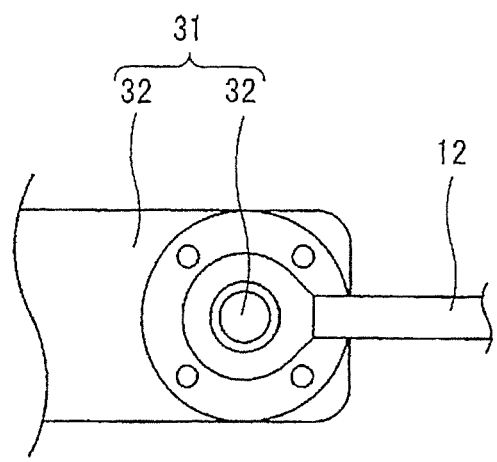
FIG. 8 is a sectional view of a shaft portion of the first link mechanism according to the third embodiment.

As shown in FIGS. 6~8, the shaft supporting arms 33 are T-shaped members shaped like a letter T. The shaft portion 32 is provided in a second end of each shaft supporting arm 33, and a first end portion of shaft supporting arm 33 is fastened to the seatbelt fixing pillar 2 by screw fasteners 34. The height position of each shaft supporting arm 33 is adjustable by selecting some of screw holes 35 formed in the seatbelt fixing pillar 2.

Shaft supporting arm 33 is T-shaped to shift the position of shaft portion 32 in the front and rear direction or longitudinal direction of the vehicle with respect to the position of seatbelt fixing pillar 2 when the shaft supporting arm 33 is fixed to the seatbelt fixing pillar 2, and thereby avoid interference between the shaft portion 32 and the driver's or front passenger's seat. Therefore, the shape is not limited, and the shaft support arms 33 may be in any of various other shapes capable of restraining the interference. The shaft supporting arms 33 and the shaft portions 32 may be formed to be capable of increasing and decreasing the length to adjust the length.

Figure 9:
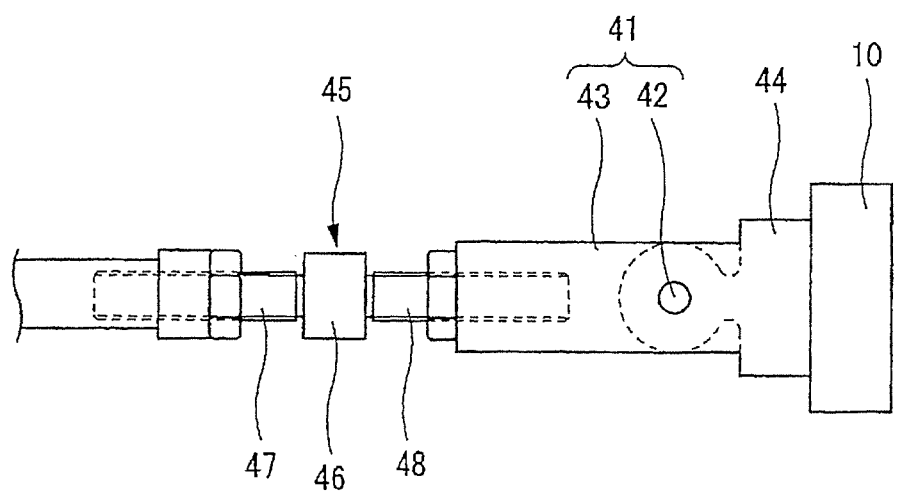
FIG. 9 is a side view showing a second link mechanism according to the third embodiment and a length adjusting mechanism.

Moreover, as shown in FIG. 5 and FIG. 9, a second link mechanism 41 connecting the second ends of vehicle restraining jigs 12 rotatably with the poles 10 includes shaft portions 42 provided at the second ends of vehicle restraining jigs 12, and shaft receiving portions or bearing portions 43 which support the shaft portions 42 rotatably, and attached to the poles 10 through brackets 44, respectively.

Each of the brackets 44 is attached to the corresponding pole 10 with a height adjusting mechanism omitted in the figure. Therefore, the height of second link mechanism 41 is adjustable.

A length adjusting mechanism 45 such as a turnbuckle is provided at the end portion of each of left and right vehicle restraining jigs 12 at the side of shaft receiving member 43. Length adjusting mechanism 45 includes a rotary operation member 46 and bolts 47 and 48 which are connected on the left and right sides of the rotary operation member 46 and which are rotated in the opposite directions by rotating the rotary operation member 46, thereby to adjust the length of the vehicle restraining jig 12 in accordance with the length of the vehicle. In the other respects, the construction is the same as the constructions of the first and second embodiments. Therefore, the same reference numerals are given to identical parts and repetitive explanation is omitted.

Following is explanation on one example of the method of using the vehicle restraint apparatus 11 according to the third embodiment.

First, the shaft supporting arm 33 of first link mechanism 31 at the first end of each vehicle restraining jig 12 is attached, at a desired height, to the seatbelt fixing pillar 2. Then, the length of shaft supporting arm 33 and the length of shaft portion 32 are adjusted according to the need, to prevent interference of the shaft portion 32 of first link mechanism 31 with the driver or front passenger's seat.

Next, the second end of each vehicle restraining jig 12 is attached to the pole 10 through the second link mechanism 41 and bracket 44.

Then, the vehicle is restrained by adjusting the lengths and the width of left and right vehicle restraining jigs 12, 12, the rollers 7 are rotated, and various tests of the vehicle 1 are performed.

The vehicle restraint apparatus 11 according to the third embodiment can enable the length adjustment and width adjustment of vehicle restraining jigs 12 and moreover prevent interference between the shaft portions 32 of first link mechanisms 31 and the driver and front passenger's seats by setting the position of shaft portion 32 of first link mechanism 31 connecting the first end of each of vehicle restraining jigs 12, 12, rotatably to the seatbelt fixing pillar 2, away from the position of seatbelt fixing pillar 2, with the shaft supporting arm 33.

Furthermore, the second link mechanism 41 is attached to the poles 10 in the manner allowing the up and down shift. Therefore, this embodiment can enable the setting for holding each vehicle restraining jig 12 substantially horizontal by moving the second link mechanism 41 in the up and down direction in conformity with the height of first link mechanism 31, and enable the various test in the horizontal state of the vehicle restraining jigs. In the other respects, the construction and effects are the same as those of the vehicle restraint apparatus according to the first and second embodiments, so that repetitive explanation is omitted.

[Fourth Embodiment]

Figure 10:
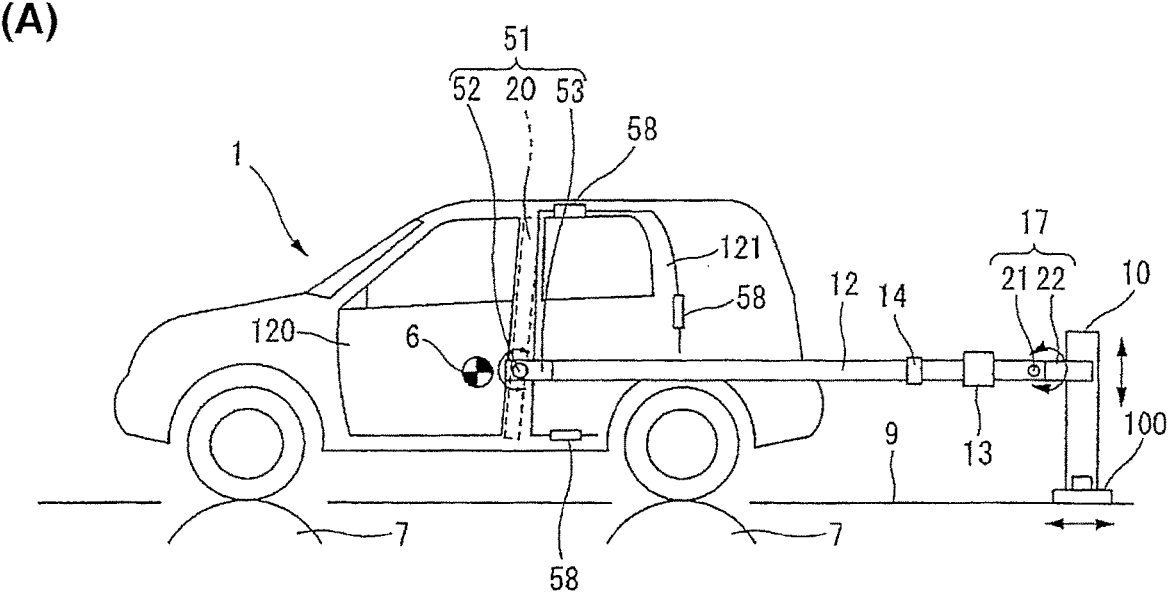
FIG. 10(A) is a schematic side view of a vehicle restraint apparatus according to a fourth embodiment, provided with a test vehicle.
FIG. 10(B) is a schematic plan view of this vehicle restraint apparatus with an enlarged view of the first link mechanism.
Figure 10:
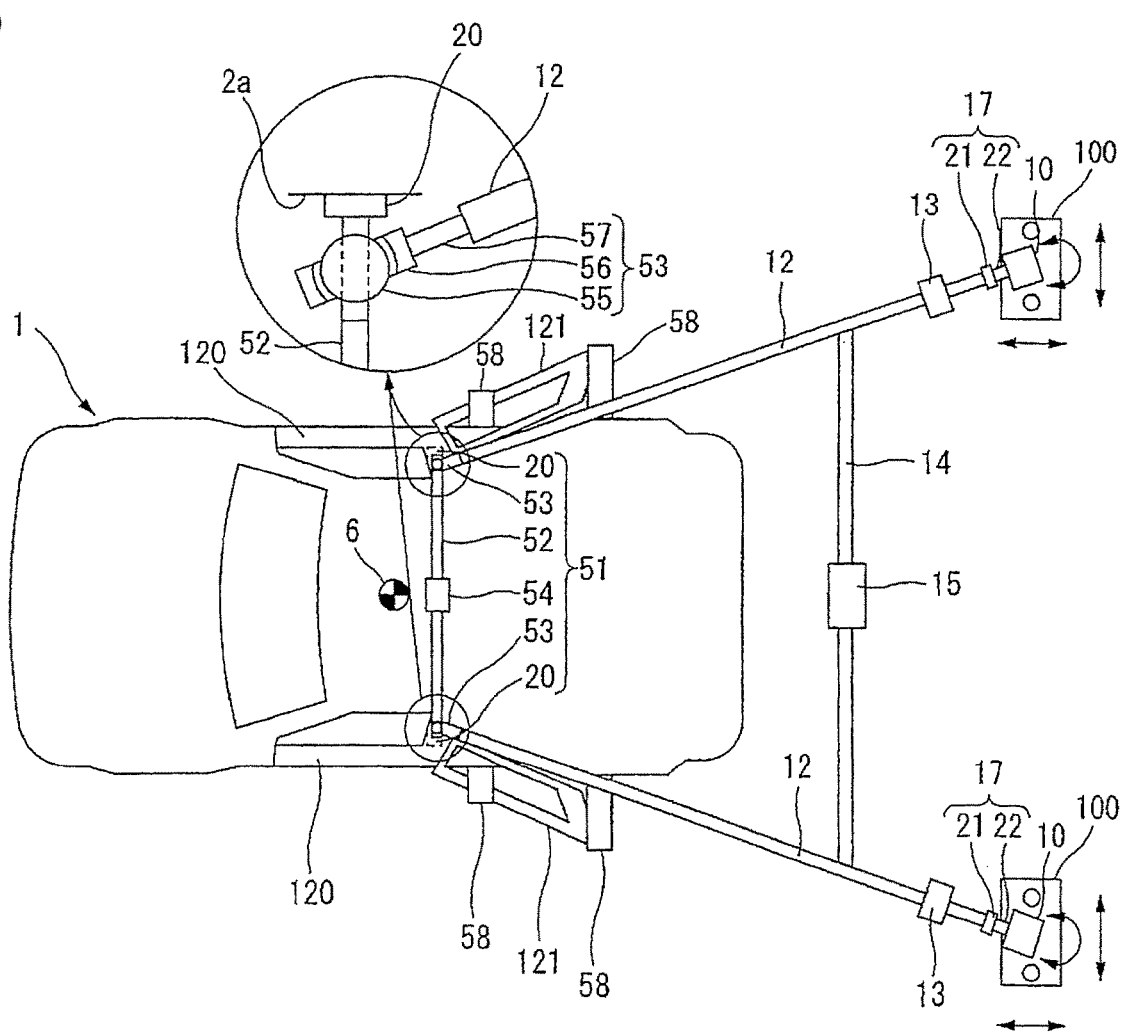
Figure 11:
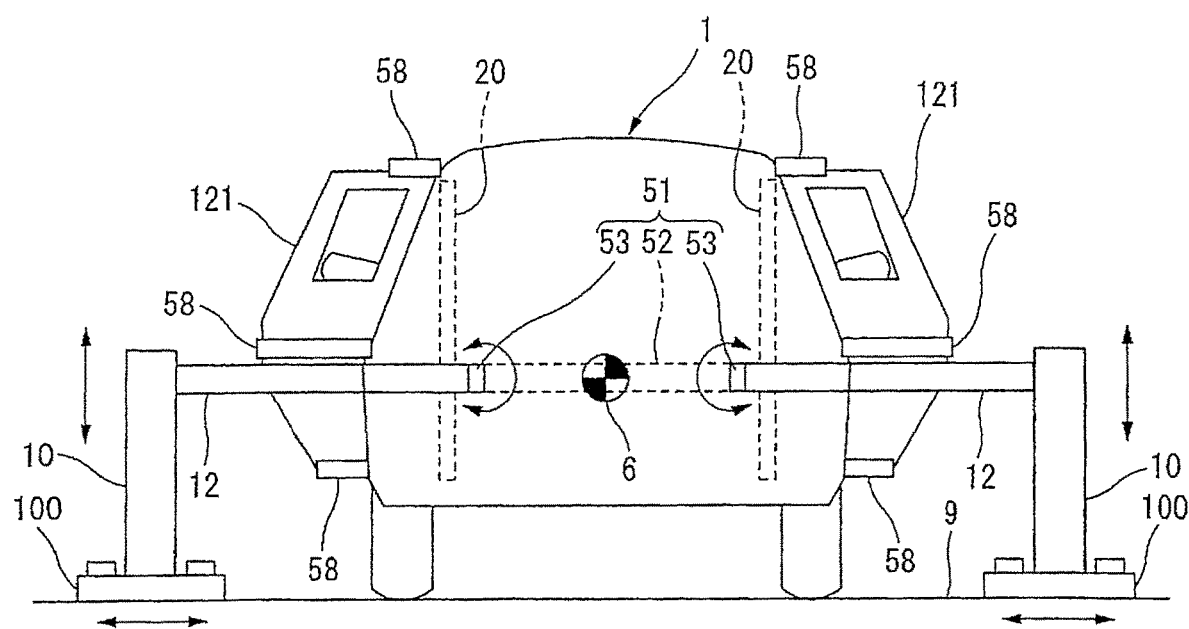
FIG. 11 is a schematic rear view of the vehicle restraint apparatus according to the fourth embodiment.

FIGS. 10 and 11 show a fourth embodiment. In this embodiment, a first link mechanism 51 is provided in place of the first link mechanisms 16 in the mode of the first embodiment.

The first link mechanism 51 includes a length-adjustable reinforcing jig 52 to connect and reinforce a pair of pillar mount members 20 attached, respectively, to the inside surfaces 2a of left and right seatbelt fixing pillars 2 in vehicle 1, and connecting jigs 53 connecting the vehicle restraining jigs 12, respectively, with portions of the first link mechanism near both ends of the reinforcing jig 52, rotatably in an omnidirectional manner to allow rotation in all rearward directions rearwards on the outer side of vehicle 1.

The reinforcing jig 52 includes a cross member connecting the left and right pillar mount members 20. Reinforcing jig 52 is provided with a length adjusting mechanism 54 to adjust the length of reinforcing jig 52. Reinforcing jig 52 is attached to the two pillar mount members 20 in an adjustable manner capable of adjusting the position of reinforcing jig 52 in the vehicle height direction (to a height substantially equal to the height of the vehicle gravity center 6, for example).

Each connecting jig 53 includes a pillow ball 55 fixedly mounted on reinforcing jig 52 near one end of the reinforcing jig 52, a spherical bearing portion 56 receiving this pillow ball 55, and a joining jig 57 joining this spherical bearing portion 56 to vehicle restraining jig 12.

Following is explanation on one example of the method of using the vehicle restraint apparatus 11 according to this embodiment with reference to FIGS. 10 and 11.

In the case of vehicle 1 having rear seat doors or rear side doors 121, for example, first the vehicle is set in the state in which the doors 121 are removed or in the state in which the doors 121 are held open and fixed by door restraining jigs 58. Alternatively, the vehicle is set in the state in which the driver's door and front passenger's door 120 are removed or in the state in which the doors 120 are held open and fixed by the door restraining jigs 58.

As door restraining jigs 58, it is possible to use various restraining jigs such as device for fixing with sucker(s). However, there is no specific limitation, and it is possible to use known restraining jigs which can fix doors so as to prevent contact between the rear seat doors 121 and vehicle restraining jigs 12. Moreover, there is no limitation to the positions and the number of door restraining jigs 58 as long as the object is achieved to prevent contact between the rear seat doors 121 and vehicle restraining jigs 12.

Next, the first ends of vehicle restraining jigs 12 inserted into vehicle 1 obliquely from the outside on the rear side are connected, respectively, with the connecting jigs 53 of first link mechanism 51 installed in vehicle 1. The vehicle restraining jig 12 connected with each connecting jig 53 is rotatable in all directions on the rear side outside vehicle 1. Next, the second ends of vehicle restraining jigs 12 are connected rotatably with the poles 10 through the second link mechanism 17 at the positions substantially equal in height to the vehicle gravity center 6.

Next, the lengths of vehicle restraining jigs 12 are adjusted with the length adjusting mechanisms 13, and the spacing between vehicle restraining jigs 12 is adjusted with the length adjusting mechanism 15. Moreover, each poles 10 is adjusted at a pedestal or base 100 on the floor to adjust the height of the pole 10, the position in the front and rear direction or longitudinal direction of vehicle 1 or the widthwise direction of vehicle 1, and the connecting direction with respect to the vehicle restraining jig 12 suitably.

After vehicle 1 is restrained in this way, the rollers 7 of the chassis dynamometer are rotated, and various tests are performed for the vehicle 1.

According to the thus-constructed vehicle restraint apparatus 11 according to this embodiment, the first ends of the seat restraining jigs 12 are connected rotatably at the inside surfaces 2a of seatbelt fixing pillars 2 by the link mechanism 51, and the other ends of vehicle restraining jigs 12 are connected rotatably at the poles 10 by the link mechanisms 17. Therefore, the restraint apparatus according to this embodiment can restrain vehicle 1 securely and firmly like the vehicle restraint apparatus of the first embodiment. Moreover, though the vehicle is restrained in the vehicle (translational) front and rear motion or longitudinal motion, the vehicle (rotational) pitching motion and the vehicle (translational) up and down motion are free. Therefore, the vehicle restraint apparatus according to this embodiment can realize the vehicle behavior with the vertical load approximate to the actual vertical load on a road, and the vertical load applied to a tire can be varied in the same manner as in the traveling state including the accelerating/decelerating state. Thus, the vehicle restraint apparatus according to this embodiment can enable tests including a test for the fuel consumption in the mode operation, an exhaust gas test, a vehicle performance test and a test for vehicle behaviors.

Especially, in this embodiment, each vehicle restraining jig 12 can be connected with the portion near one end of reinforcing jig 52 in vehicle 1, obliquely from the outside of vehicle 1 on the rear side, through connecting jig 53, in the state in which the rear seat door of vehicle 1 is removed or fixed open. Therefore, without receiving influence of the shapes of the rear seats and trunk room etc., it is possible to adjust the connecting position between vehicle 1 and vehicle restraining jig 12, easily near the vehicle gravity center 6. Furthermore, it is possible to minimize the alteration of vehicle 1 required at the time of setting the vehicle 1 in the vehicle test system, and hence reduce the time of preparation for the test.

Furthermore, vehicle restraining jigs 12 are made rotatable in all directions on the rear side outside the vehicle 1, by the connecting jigs 53, at the respective positions near the pillar mount members 20 (near both ends of reinforcing jig 52 in this practical example). Therefore, it is possible to set the vehicle restraining jigs 12 at desired positions at or near the height of vehicle gravity center 6 in accordance with the space in vehicle 1 in which vehicle restraining jigs 12 are inserted. Accordingly, the vehicle restraint apparatus of this embodiment can prevent a pitching movement of vehicle 1 (over swing, for example) which could be caused, differently from the travel on the road, when the vehicle test is performed in the state in which vehicle 1 restrained at the height positions remote from the vehicle gravity center 6 to avoid interference with the rear seats and trunk room of vehicle 1.

Moreover, the pair of confronting pillar mount members 20 are connected and reinforced by the reinforcing jig 52 in vehicle 1. Furthermore, the vehicle restraining jigs 12 are connected through the connecting jigs 53 with the reinforcing jig 52 near both ends of this reinforcing jig 52. Therefore, it is possible to reduce the load factor of moment (torque) of the vehicle restraining jigs 12 to the reinforcing jig 52, and hence it is possible to prevent deformation of the reinforcing jig 52 and deformation and breakage of pillar mount members 20 caused by the deformation of reinforcing jig 52. Furthermore, the length adjusting mechanism 54 can adjust the length of reinforcing jig 52, to a desired length corresponding to the size of vehicle 1. Furthermore, the reinforcing jig 52 is arranged to adjust the positions at the left and right pillar mount members 20 in the vehicle height direction of vehicle 1, so that the reinforcing jig 5 can be adjusted to a height close to the vehicle gravity center 6 in dependence on the size of vehicle 1.

As evident from the explanation above, the vehicle restraint apparatus 11 according to this embodiment is effective for restraining the vehicle 1 of the four door type, for example.

In the case in which the pillar mount members 20 are rigid enough because of the selection of the material, the reinforcing jig 52 is not always required by the first link mechanisms 51. In this case, the pillow ball 55 of each connecting jig 53 is installed and fixed to a short small fixing shaft provided integrally in the pillar mount member 20, for example.

[Fifth Embodiment]

Figure 12:
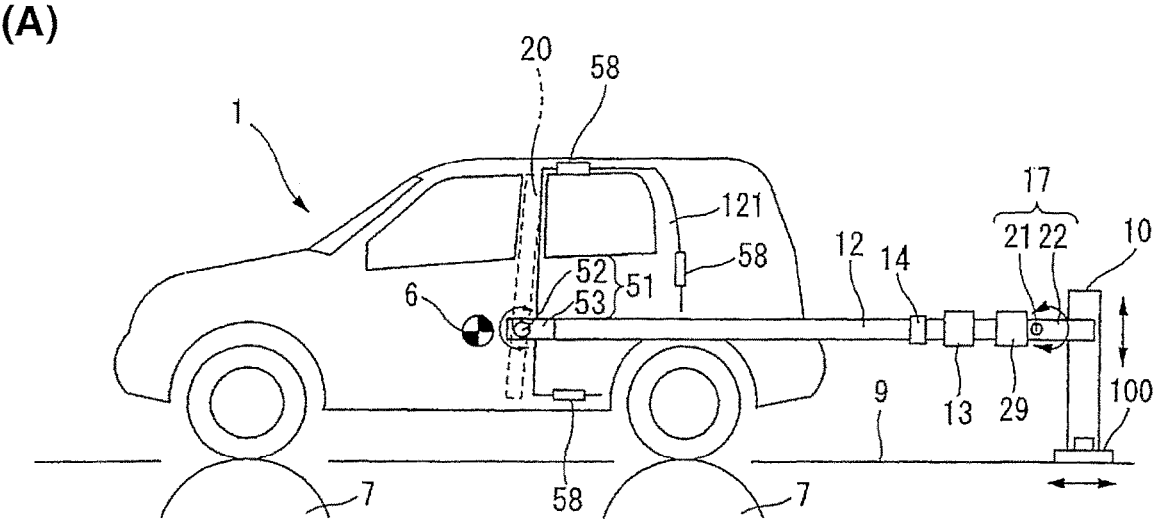
FIGS. 12(A) and 12(B) are schematic side view and schematic plan view of a vehicle restraint apparatus according to a fifth embodiment of the present invention, provided with a test vehicle.
Figure 12:
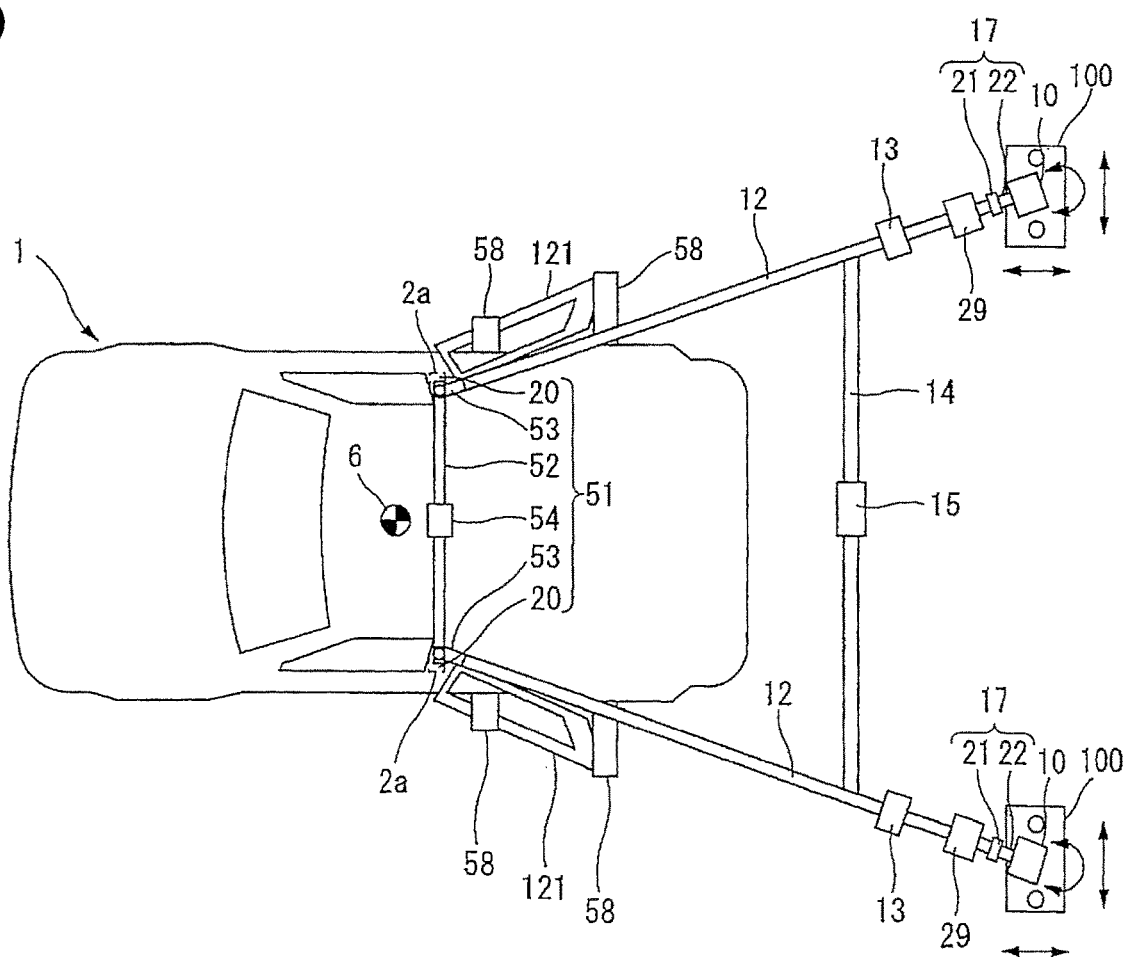

FIG. 12 shows a fifth embodiment. In this embodiment, the restraining force sensor(s) 29 is provided between the vehicle restraining jigs 12 and second link mechanism 17 in the mode of the fourth embodiment, and arranged to sense the restraining force of the vehicle. The position of restraining force sensor 29 is not limited to the region between the vehicle restraining jig 12 and second link mechanism 17. Restraining force sensor(s) 29 may be provided at a position between second link mechanism 17 and poles 10, a position between first link mechanism 16 and seatbelt fixing pillar 2, or some other position capable of securely sensing the restraining force of restraining vehicle 1. The vehicle restraint apparatus 11 of this embodiment capable of sensing the vehicle restraining force makes it possible to measure and analyze the vehicle sprung characteristics, in addition to the effects of the fourth embodiment.

[Sixth Embodiment]

FIGS. 13(A) and 13(B) show a sixth embodiment. In this embodiment, the first end of vehicle restraining jig 12 is connected rotatably to each of the left and right seatbelt fixing pillars 2 through the first link mechanism 51 at a position in the vicinity of the vehicle gravity center 6, obliquely from the rear side in the inside of vehicle 1, and the other respects are the same as the fourth embodiment.

Figure 13:
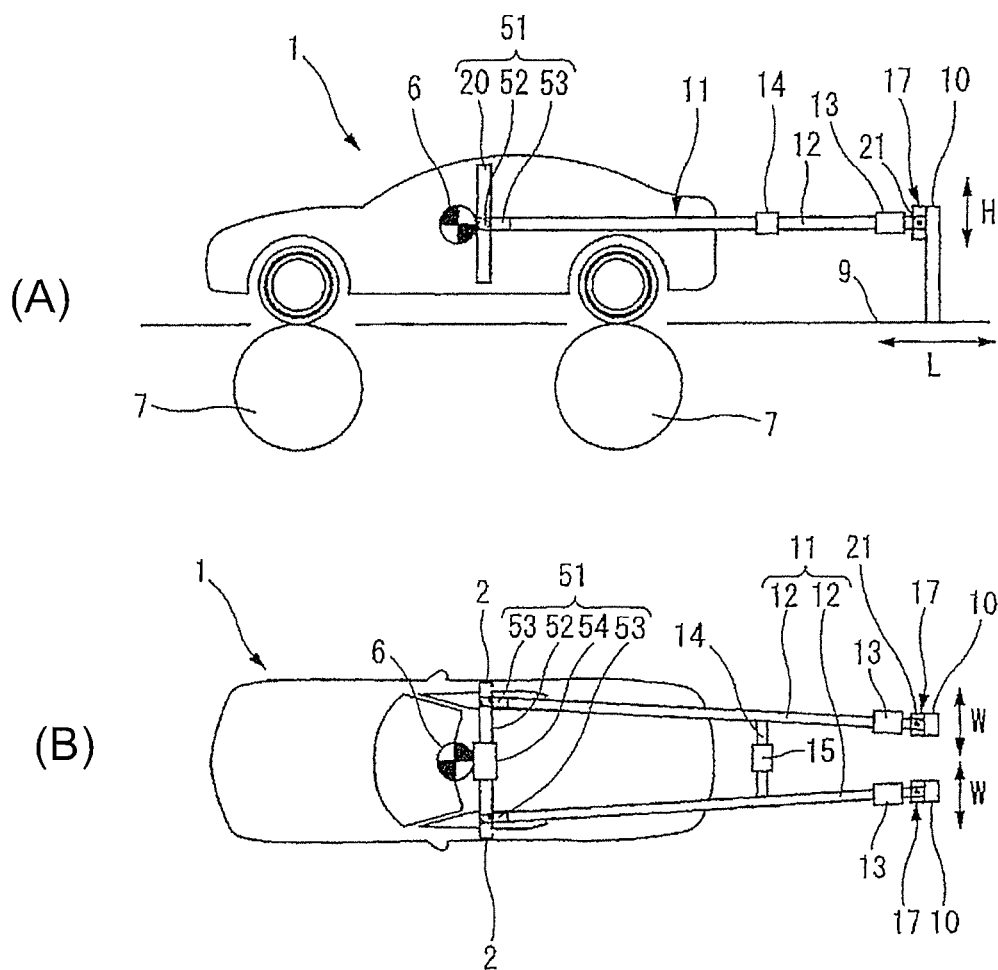
FIGS. 13(A) and 13(B) are schematic side view and schematic plan view of a vehicle restraint apparatus according to a sixth embodiment of the present invention, provided with a test vehicle.

Following is explanation on one example of the use of the vehicle restraint apparatus 11 of this embodiment with reference to FIG. 13.

In the case of vehicle 1 to be tested being a vehicle having a rear door, such as a hatchback type vehicle, for example, the rear door is opened and fixed by a door restraining jig 58 omitted in the figure. Next, to the connecting jigs 53 of first link mechanism 51 installed in vehicle 1, the first ends of vehicle restraining jigs 12 inserted into vehicle 1, obliquely from the rear inside the vehicle 1 are connected. The vehicle restraining jigs 12 connected with the connecting jigs 53 are rotatable in all directions rearwards inside the vehicle 1. Next, as in the fourth embodiment, the second ends of vehicle restraining jigs 12 are connected rotatably, through second link mechanisms 17, with poles 10 at positions substantially equal in height to the vehicle gravity center 6. Moreover, the lengths and spacing of vehicle restraining jigs 12 are adjusted, respectively, with length adjusting mechanisms 13 and 15. Poles 10 are adjusted too to adjust the heights and the positions in the front and rear direction or the left and right direction and the connecting directions of vehicle restraining jigs 12. After vehicle 1 is retrained as mentioned above, various tests for vehicle 1 are performed by rotating rollers 7 of the chassis dynamometer.

According to the thus-constructed vehicle restraint apparatus 11 according to this embodiment, the first ends of seat restraining jigs 12 are connected rotatably at the inside surfaces 2a of seatbelt fixing pillars 2 by the link mechanism 51, and the other ends of vehicle restraining jigs 12 are connected rotatably at the poles 10 by link mechanisms 17. Therefore, the restraint apparatus according to this embodiment can restrain vehicle 1 securely and firmly like the vehicle restraint apparatus of the fourth embodiment. Moreover, though the vehicle is restrained in the vehicle (translational) longitudinal motion, the vehicle (rotational) pitching motion and the vehicle (translational) up and down motion are free. Therefore, the vehicle restraint apparatus according to this embodiment can realize the vehicle behavior with the vertical load approximate to the actual vertical load on a road.

Especially, in this embodiment, each vehicle restraining jig 12 can be connected near one end of reinforcing jig 52 in vehicle 1, obliquely from the rear side in the inside of vehicle 1. Therefore, it is possible to adjust the connecting position between vehicle 1 and vehicle restraining jig 12, easily near the vehicle gravity center 6 in a state reducing physical interference with the rear tire house and the opening of the rear door. Furthermore, it is possible to minimize the alteration of vehicle 1 required at the time of setting the vehicle 1 in the vehicle test system, and hence reduce the time of preparation for the test.

Furthermore, vehicle restraining jigs 12 are made rotatable in all directions on the rear side of the inside of vehicle 1, by the connecting jigs 53, at the portions of the first link mechanism near the pillar mount members 20 (near both ends of reinforcing jig 52 in this practical example). Therefore, it is possible to set the vehicle restraining jigs 12 at desired positions at or near the height of vehicle gravity center 6 in accordance with the space in vehicle 1 in which vehicle restraining jigs 12 are inserted. Accordingly, the vehicle restraint apparatus of this embodiment can prevent a pitching movement of vehicle 1 (over swing, for example) which could be caused, differently from the travel on the road, when the vehicle test is performed in the state in which vehicle 1 restrained at the height positions set remote from the vehicle gravity center 6 to avoid interference with the rear tire house and the opening of rear door of vehicle 1.

Moreover, the pair of pillar mount members 20 confronting each other in the vehicle are connected by the reinforcing jig 52. Furthermore, the vehicle restraining jigs 12 are connected through the connecting jigs 53 with the portions near both ends of this reinforcing jig 52. Therefore, the pillar mount members 20 are reinforced as in the fourth embodiment. Moreover, because the load factor of moment (torque) of the vehicle restraining jigs 12 to the reinforcing jig 52 is reduced, it is possible to prevent deformation of the reinforcing jig 52 and deformation and breakage of pillar mount members 20 caused by the deformation of reinforcing jig 52. Furthermore, the length adjusting mechanism 54 can adjust the length of reinforcing jig 52, to a desired length corresponding to the size of vehicle 1.

As evident from the explanation above, the vehicle restraint apparatus 11 according to this embodiment is effective for restraining the vehicle 1 of the two door type and the rear door type having a rear door, for example.

In the case in which the pillar mount members 20 are rigid enough because of the selection of the material, the reinforcing jig 52 is not always required by the first link mechanisms 51. In this case, the pillow ball 55 of each connecting jig 53 is installed and fixed to a short small fixing shaft provided integrally in the pillar mount member 20, for example, as mentioned before.

[Seventh Embodiment]

Figure 14:
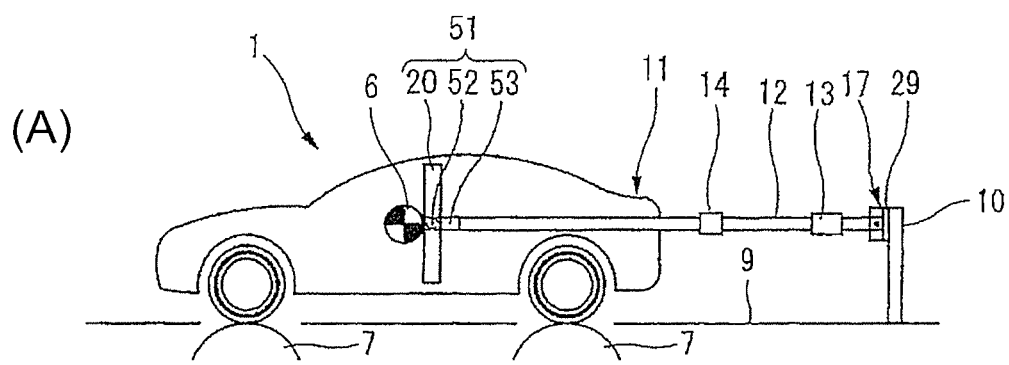
FIGS. 14(A) and 14(B) are schematic side view and schematic plan view of a vehicle restraint apparatus according to a seventh embodiment of the present invention, provided with a test vehicle.
Figure 14:
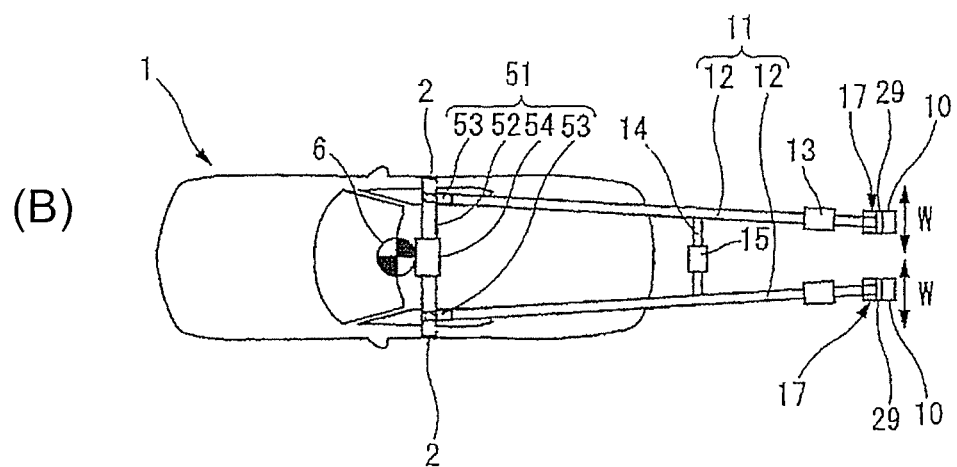

FIGS. 14(A) and 14(B) show a seventh embodiment. In this embodiment, the restraining force sensor or sensors 29 is provided between the first link mechanism 17 and pole 10 in the mode of the sixth embodiment, and arranged to sense the restraining force of the vehicle. The position of restraining force sensor 29 is not limited to the region between the second link mechanism 17 and pole 10. Restraining force sensor(s) 29 may be provided at a position between vehicle restraining jig 12 and the second link mechanism 17, a positon between first link mechanism 16 and seatbelt fixing pillar 2, or some other position capable of sensing the restraining force of restraining vehicle 1 securely. The vehicle restraint apparatus 11 of this embodiment capable of sensing the vehicle restraining force makes it possible to measure and analyze the vehicle sprung characteristics, in addition to the effects of the sixth embodiment.

[Eighth Embodiment]

Figure 15:
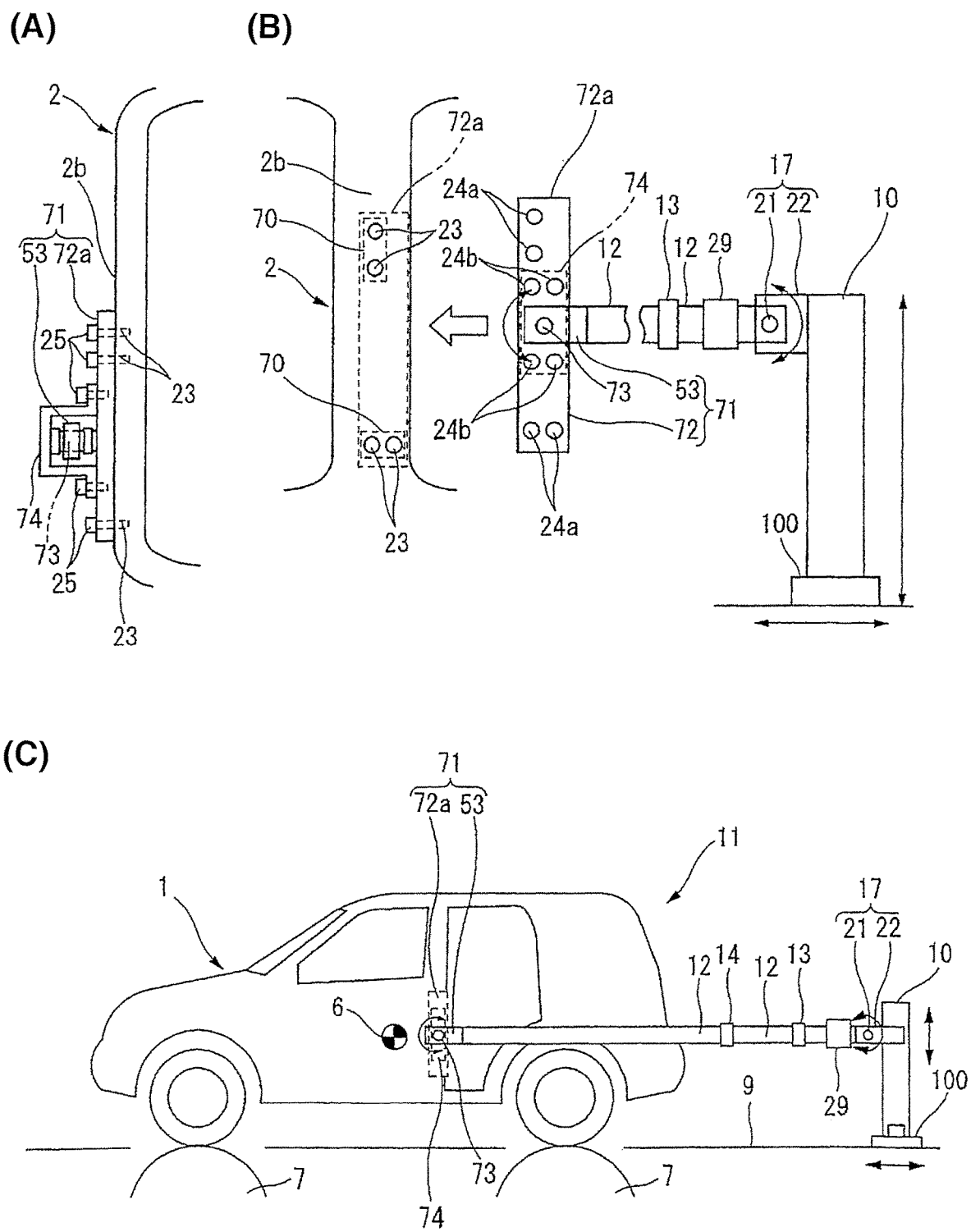
FIGS. 15(A), 15(B) and 15(C) are views for illustrating one example of the mode of attaching the vehicle restraining jig to the seatbelt fixing pillar in an eighth embodiment.
Figure 16:
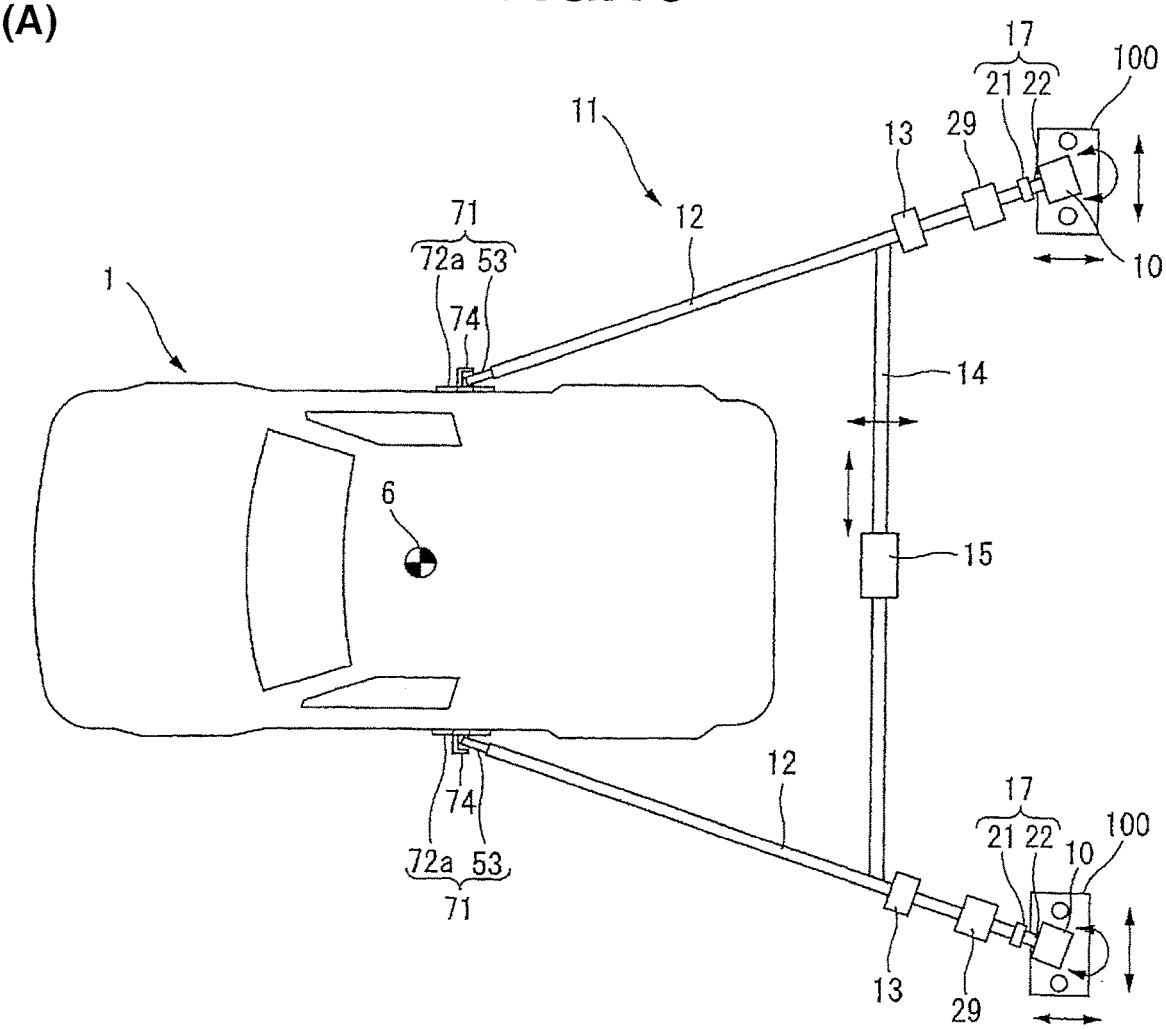
FIGS. 16(A) and 16(B) are schematic side view and schematic rear view of a vehicle restraint apparatus according to the eighth embodiment, provided with a test vehicle.
Figure 16:
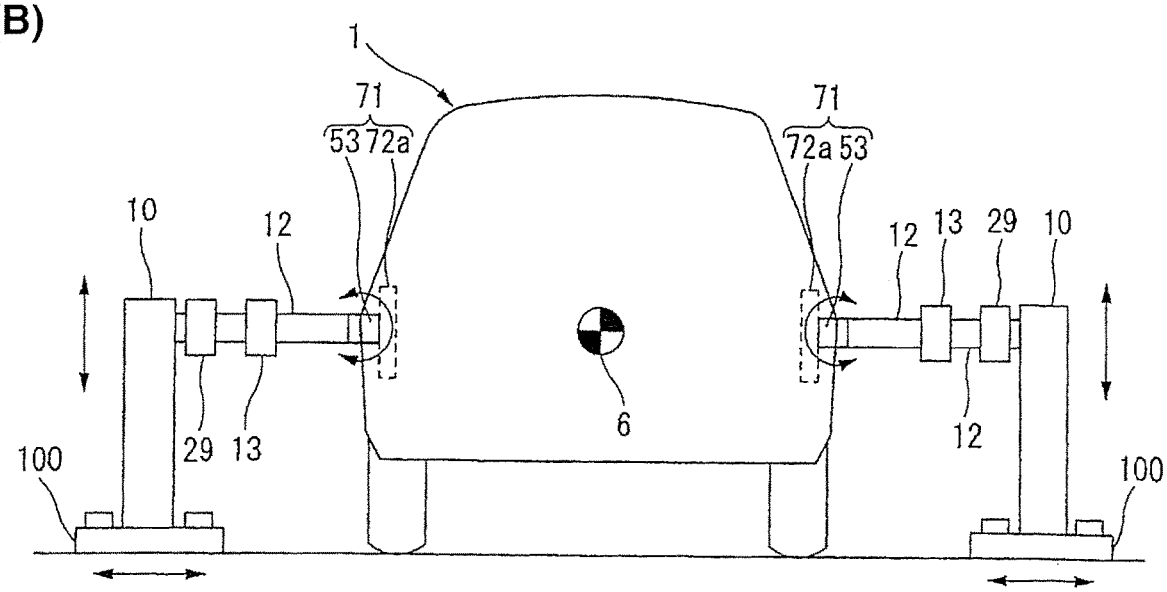

In a vehicle restraint apparatus of an eighth embodiment shown in FIGS. 15 and 16, there is provided a first link mechanism 71 in place of the first link mechanism 51 in the mode of the fourth embodiment.

The first link mechanism 71 includes a pair of pillar mount members 72a attached or fixed, respectively, to the outside surfaces 2b of left and right seatbelt fixing pillars 2, connecting shafts 73 attached or fixed, respectively, to the outside surfaces of pillar mount members 75, connecting jigs 53 mounted on the connecting shafts 73 and arranged to connect the vehicle restraining jigs 12 rotatably in all directions rearwards in the outside of vehicle 1, and pressing members 74 pressing and fixing the connecting shafts 73 to the pillar mount member 72a, respectively.

Each pillar mount member 72a is formed with screw holes 24a receiving screw fasteners 25 screwed therein, for fastening this member 72a to the outside surface 2b of seatbelt fixing pillar 2, and screw holes 24b receiving screw fasteners 25 screwed therein, for fastening the pressing member to this member 72a. In each pillar mount member 72a, the connecting shaft 73 is arranged to be able to adjust the position of the connecting shaft 73 in the vehicle height direction.

Following is explanation on an example of the use of vehicle restraint apparatus according to this embodiment with reference to FIGS. 15 and 16.

First, the rear seat doors and door hinges are removed from attachment portions 70 in the outside surfaces 2b of left and right seatbelt fixing pillars 2 of vehicle 1, supporting the rear seat doors and the door hinges.

On the other hand, the connecting shaft 73 with the connecting jig 53 mounted on the connecting shaft is attached preliminarily to the outside surface of each pillar mount member 72a so that the connecting shaft 73 projects from the outside surface of pillar mount member 72a, and the pressing member 74 is fastened to this member 72a by screw fasteners 25 in the state pressing the connecting shaft 73.

Next, in the state in which each screw hole 24a of pillar mount member 72a is superposed on the mating screw hole 23 formed in the attachment portion 70 in the outside surface 2b of each seat belt fixing pillar 2, the screw fastener 25 is screwed into these screw holes 23 and 24a. Through the pillar mount members 72a fixed to the outside surface 2b of seatbelt fixing pillars 2 in this way, the first link mechanism 71 is attached to the outside surfaces 2b of seatbelt fixing pillars 2. The connecting jigs 53 of first link mechanism 71 attached to the outside surfaces 2b of seatbelt fixing pillars 2, at the positions near the vehicle brevity center 6 are connected with the first ends of vehicle restraining jigs 12 inserted obliquely from the rear side in the outside of vehicle 1 in vehicle 1. The vehicle restraining jigs 12 connected with connecting jigs 53 are rotatable in the omnidirectional manner in all directions rearwards in the outside of vehicle 1 by the pillow balls 55 (FIG. 10) of connecting jigs 53.

Next, as in the fourth embodiment, the lengths of vehicle restraining jigs 12 are adjusted with length adjusting mechanisms 13. Furthermore, the second ends of vehicle restraining jigs 12 are connected rotatably with poles 10 through second link mechanism 17 at the positions substantially equal in height to the height position of vehicle gravity center 6. Then, poles 10 are adjusted at the pedestals 100 of the poles to adjust the heights of the poles, the positions of the poles in the front and rear direction or widthwise direction of vehicle 1 and the connecting directions with vehicle restraining jigs 12 appropriately.

After vehicle 1 is thus restrained, various tests are performed for vehicle 1 by rotating the rotors 7 of chassis dynamometer.

As mentioned above, the vehicle restraint apparatus 11 of this embodiment connects the first ends of vehicle restraining jigs 12 rotatably with the seatbelt fixing pillars 2 at the outside surfaces 2b with first link mechanisms 71, and connects the second ends of vehicle restraining jigs 12 rotatably at poles 10 with second link mechanisms 17.

Therefore, the vehicle restraint apparatus 11 of this embodiment provides the same effects as the vehicle restraint apparatus according to the fourth embodiment. Specifically, the restraint apparatus according to this embodiment can restrain vehicle 1 securely and firmly. Moreover, though the vehicle is restrained in the vehicle (translational) front and rear motion, the vehicle (rotational) pitching motion and the vehicle (translational) up and down motion are free. Therefore, the vehicle restraint apparatus according to this embodiment can realize the vehicle behavior with the vertical load approximate to the actual vertical load on a road.

Especially in the case of test vehicle 1 having rear side doors or rear seat doors 121, the vehicle can be restrained by removing the rear side doors 121, attaching the first link mechanism 71 to the outside surfaces 21b of left and right seatbelt fixing pillars 2 of vehicle 1, and connecting the first ends of vehicle restraining jigs 12 with the first link mechanism 71. According to this mode, at the time of vehicle test, the driver's seat and front passenger's seat are adjustable toward the rear, and the distance between the driver's seat and the steering wheel is adjustable to a desired distance. Therefore, this vehicle restraint apparatus can secure the distance between the steering wheel and the driver's seat required by the physique of a driver or the installation of measurement equipment, and avoid adverse influence on the test operation of vehicle 1.

Moreover, the connecting shafts 73 are adjustable in the vehicle height direction at the pillar mount members 72a. Therefore, it is possible to adjust the positions of connecting shafts 73 to desired positions in the vicinity of the vehicle gravity center 6 in dependence on the size of vehicle 1.

Figure 17:
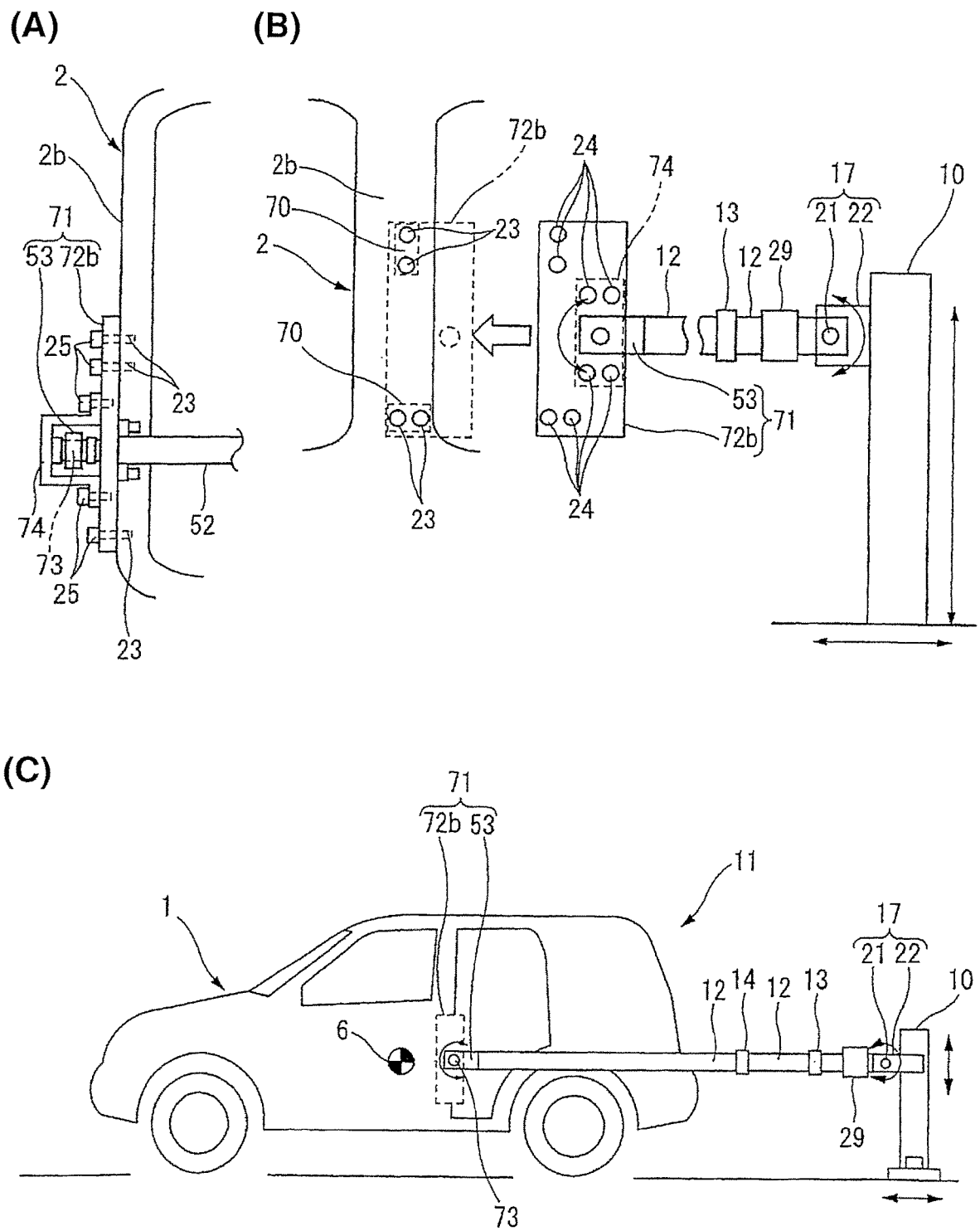
FIGS. 17(A), 17(B) and 17(C) are views for illustrating one example of the mode of attaching the vehicle restraining jig to the seatbelt fixing pillar in the eighth embodiment.
Figure 18:
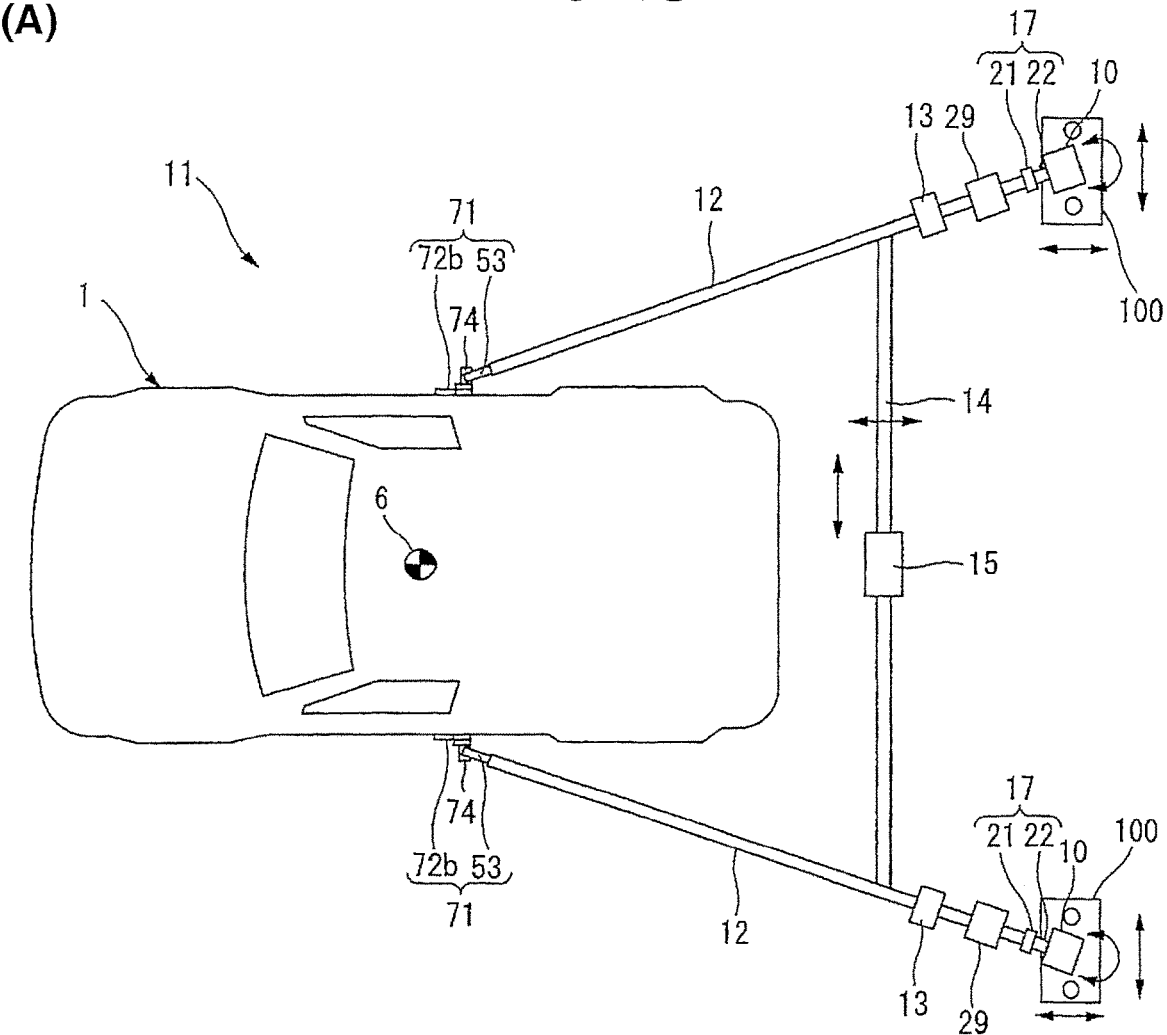
FIGS. 18(A) and 18(B) are schematic side view and schematic rear view of a vehicle restraint apparatus according to the eighth embodiment, provided with a test vehicle.
Figure 18:
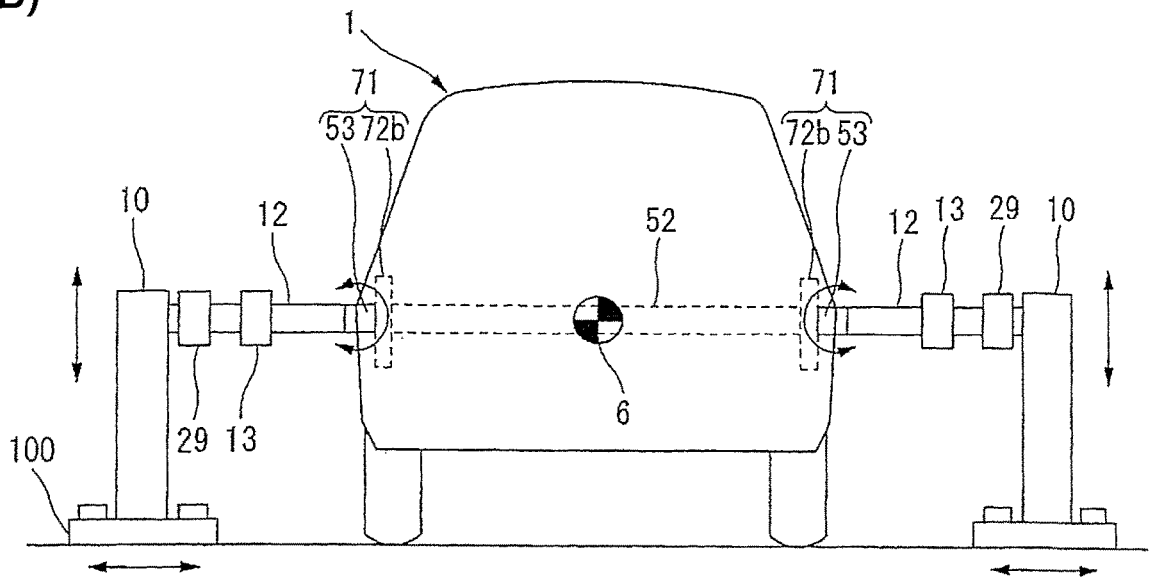

In this embodiment, the pillar mount members 72a may be replaced by pillar mount members 72b as shown in FIGS. 17 and 18.

The pillar mount members 72b are wider than pillar mount members 72a. As shown in FIG. 17(B), the pillar mount member 72b on each side is attached to the outside surface 2b of seatbelt fixing pillar 2 in the state in which one of longer sides projects from the seatbelt fixing pillar 2 rearwards (in the wheel base direction).

The connecting jig 53 on each side for connecting the vehicle restraining jig 12 rotatably in the omnidirectional manner rearwards outside vehicle 1 is preliminarily mounted on the connecting shaft 73 fixed upright to the outside surface of pillar mount member 72b by the pressing member 74 at a position near the seatbelt fixing pillar 2 on the rear side of the seatbelt fixing pillar 2. The connecting shafts 73 are adjustable in the vehicle height direction in this practical example, too.

The left and right pillar mount members 72b confronting each other in vehicle 1 through left and right seatbelt fixing pillars 2 are connected and reinforced by the reinforcing jig 52 which is disposed coaxially with the connecting shafts 73 and which is adjustable in length. The position of reinforcing jig 52 in this mode is also adjustable in the vehicle height direction. The reinforcing jig 52 may be connected with connecting shafts 73.

In this way, in the practical example of FIGS. 17 and 18, the width of each pillar mount member 72b is increased in the vehicle wheel base direction (offset in the wheel base direction). The vehicle restraining jig 12 is attached to the portion of outside surface of this pillar mount member 72b near, and on the rear side of, the seatbelt fixing pillar 2, rotationally in the rearward omnidirectional manner on the outside.

Therefore, in the practical example of FIGS. 17 and 18, at the time of vehicle test, the driver's seat and front passenger's seat are adjustable toward the rear, and the distance between the driver's seat and the steering wheel is adjustable to a desired distance, as in the practical example of FIGS. 15 and 16.

Especially, the length-adjustable reinforcing jig 52 connecting and reinforcing the left and right pillar mount members 72b confronting each other through vehicle 1 can increase the rigidity of pillar mount members 72b. Moreover, since the reinforcing jig 52 and connecting shafts 73 are adjustable in the vehicle height direction at the pillar mount members 72b, the reinforcing jig 53 and connecting shafts 73 can be set at desired heights in the vicinity of vehicle gravity center 6 in dependence on the size of vehicle 1.

Figure 19:
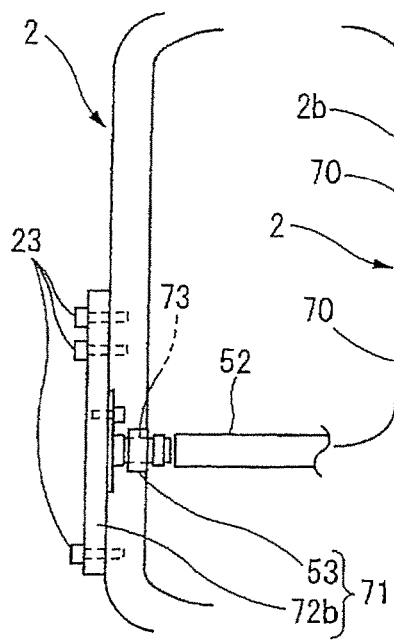
FIGS. 19(A), 19(B) and 19(C) are views for illustrating one example of the mode of attaching the vehicle restraining jig to the seatbelt fixing pillar in the eighth embodiment.
Figure 19:
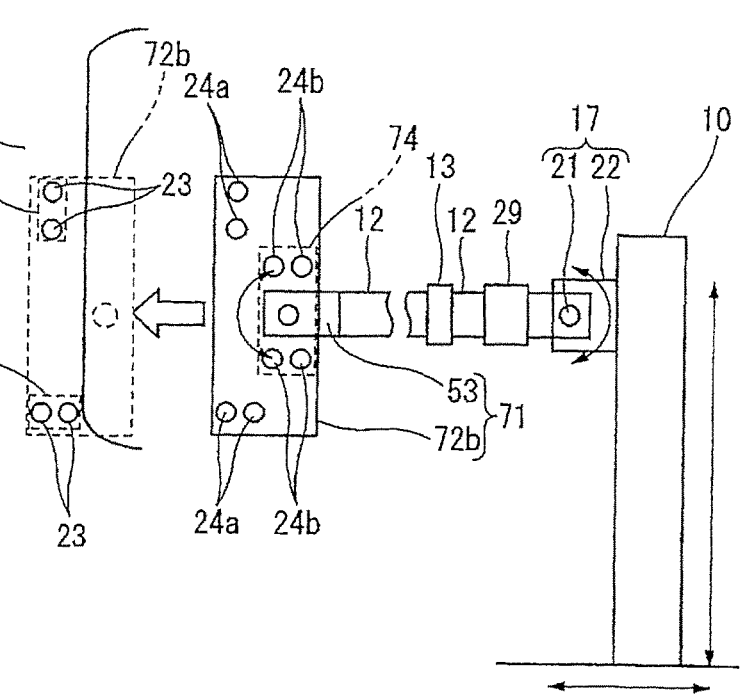
Figure 19:
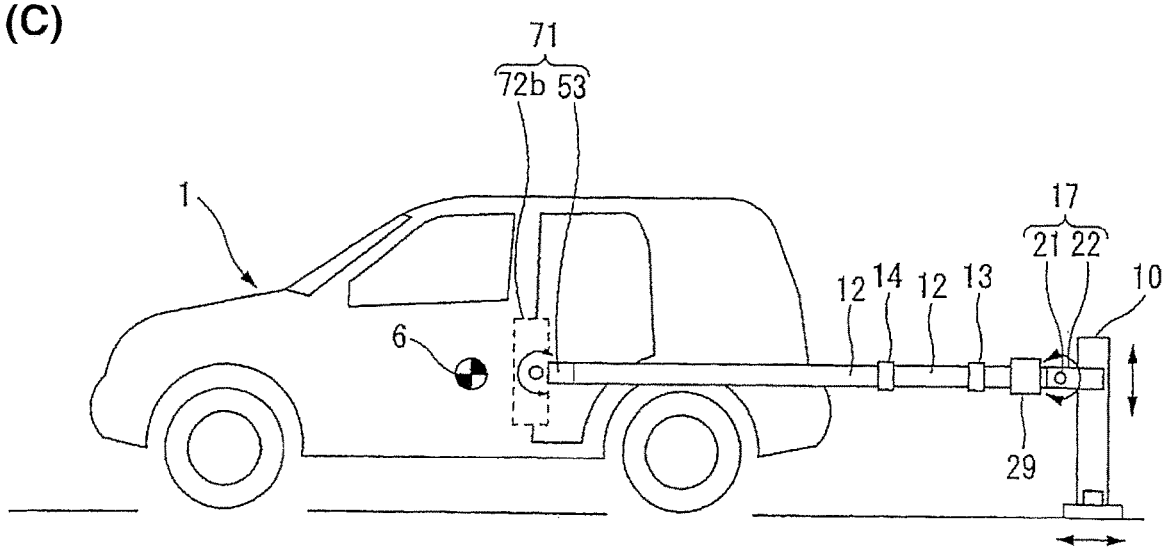
Figure 20:
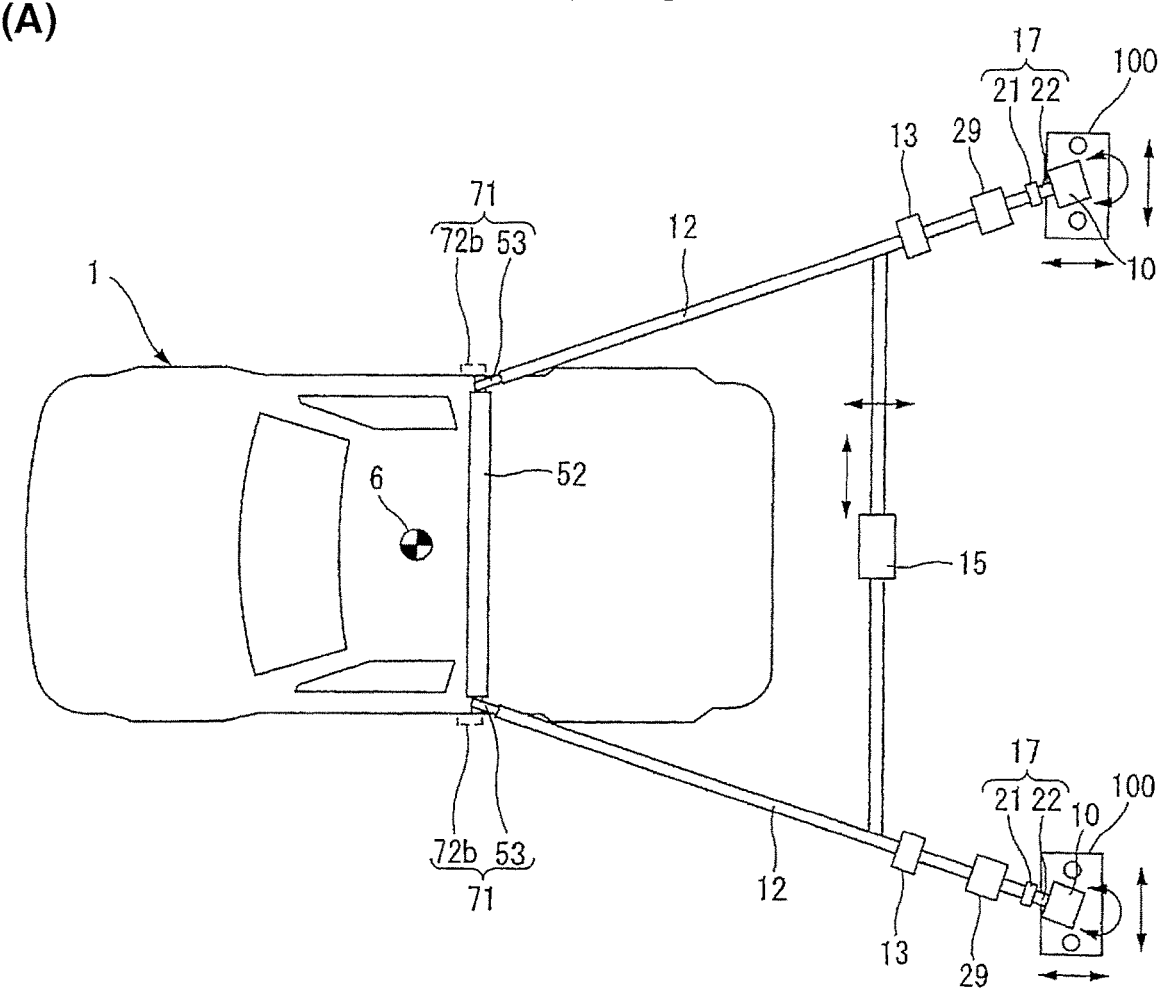
FIGS. 20(A) and 20(B) are schematic side view and schematic rear view of a vehicle restraint apparatus according to the eighth embodiment, provided with a test vehicle.
Figure 20:
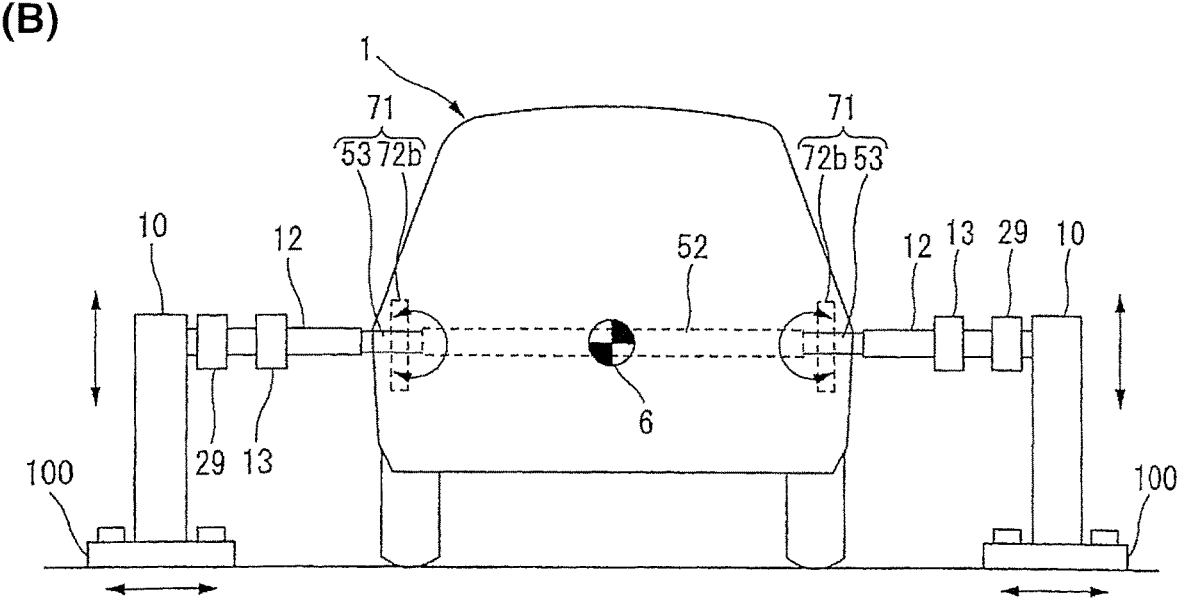

Furthermore, in this embodiment, the connecting shaft 73 connected rotatably with the connecting jig 53 on each side may be formed so that the connecting shaft 73 projects from the inside surface of the pillar mount member 72b, as shown in FIGS. 19 and 20. The connecting shafts 73 of this practical example are also adjustable in the vehicle height direction.

The connecting shaft 73 on each side is fixed to the inside surface of the pillar mount member 72b and projects from the inside surface of pillar mount member 72b at the position near the seatbelt fixing pillar 2 on the rear side of seatbelt fixing pillar 2. Moreover, the connecting shafts 73 are connected with the reinforcing jig 52 connecting and reinforcing the left and right pillar mount members 72b confronting each other in the vehicle 1.

This practical example can provide the same effects as the practical example of FIGS. 17 and 18. Especially, this practical example does not require the pressing members 74 for pressing the connecting shafts 73. Therefore, it is possible to reduce the number of component parts of the link mechanism 71 and to simplify the operation of assembling the vehicle restraint apparatus 11 with vehicle 1.

Figure 21:
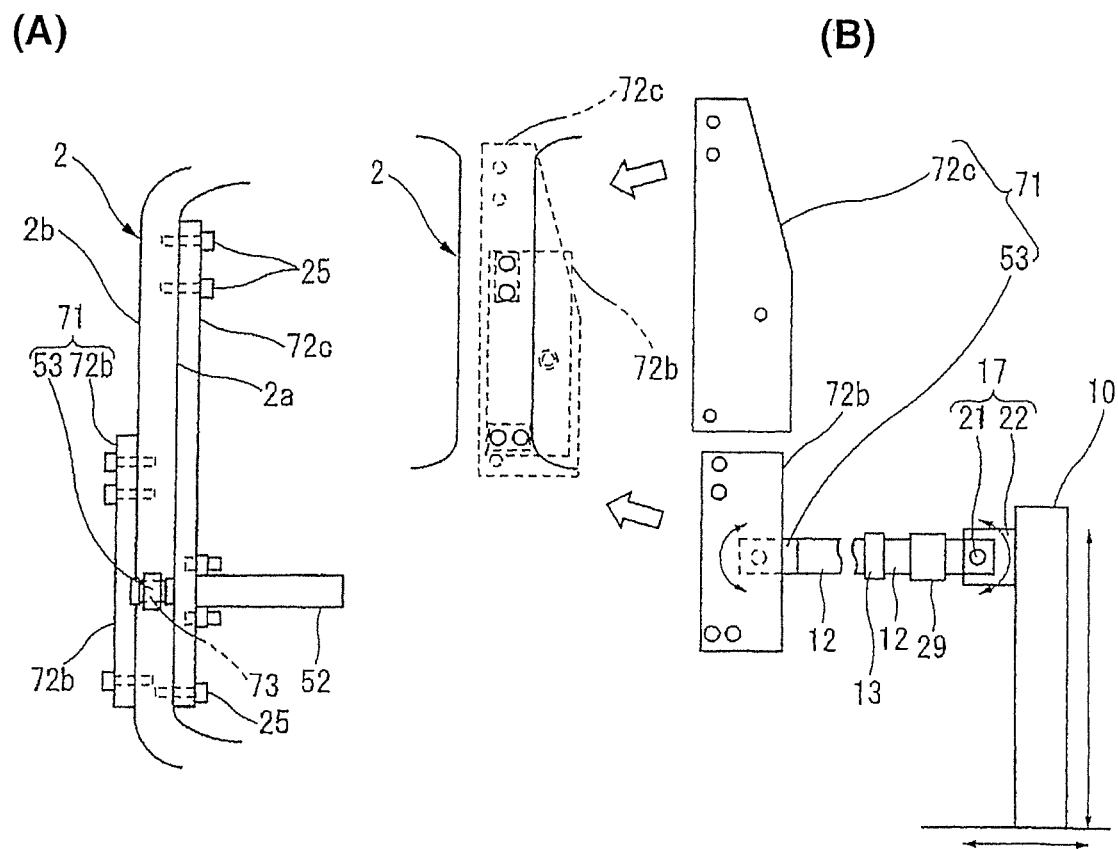
FIGS. 21(A), 21(B) and 21(C) are views for illustrating one example of the mode of attaching the vehicle restraining jig to the seatbelt fixing pillar in the eighth embodiment.
Figure 21:
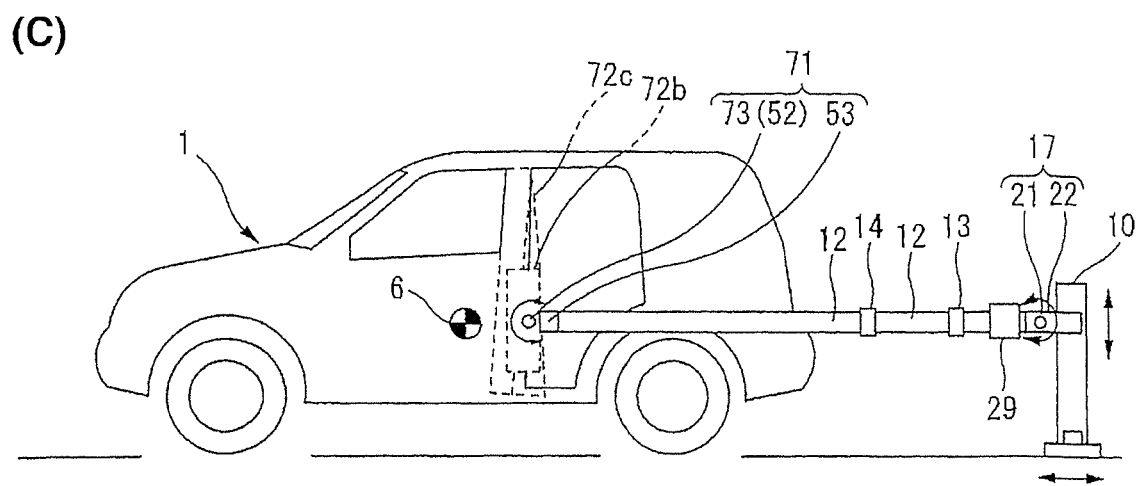
Figure 22:
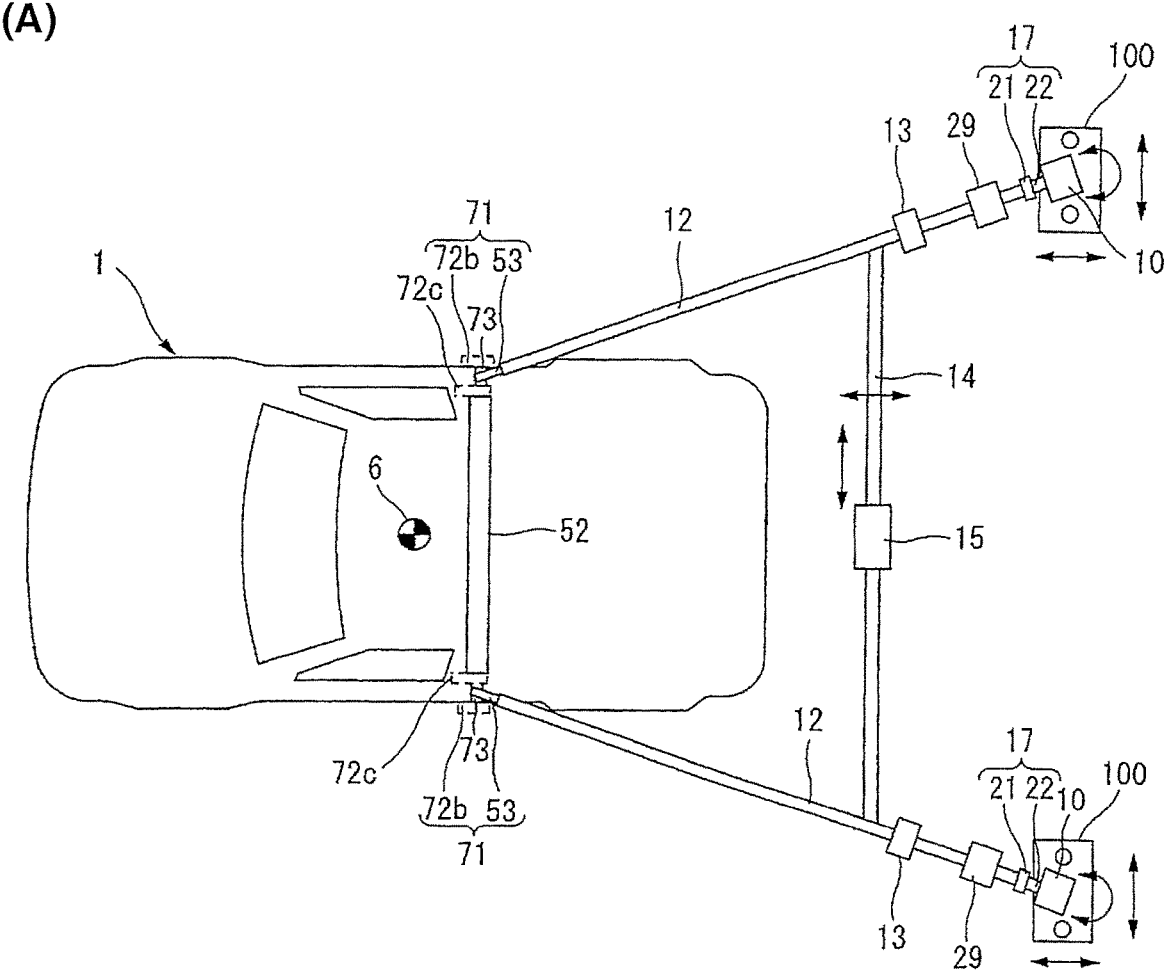
FIGS. 22(A) and 22(B) are schematic side view and schematic rear view of a vehicle restraint apparatus according to the eighth embodiment, provided with a test vehicle.
Figure 22:
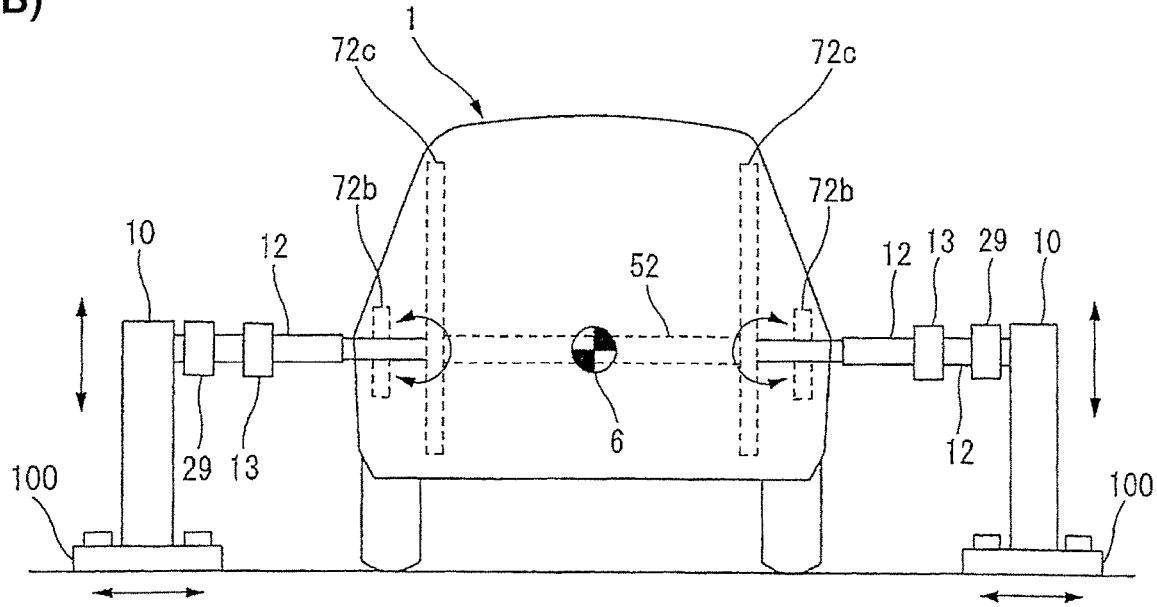

Furthermore, in this embodiment, as shown in FIGS. 21 and 22, there may be provided, between the connecting shaft 73 on each side and the reinforcing jig 52, a pillar mount member 72c. The pillar mount member 72c is wider and longer than the pillar mount member 72b.

The pillar mount member 72c is attached to the inside surface 2a of each of the left and right seatbelt fixing pillars 2 by screw fasteners 25 in the state in which the connecting shaft 73 provided with the connecting jig 53 is clamped between the pillar mount member 72c and the pillar mount member 72b. The left and right pillar mount members 72c thus fixed to the inside surfaces 2a of left and right seatbelt fixing pillars 2 are connected and reinforced by the length adjustable reinforcing jig 52 disposed coaxially with the connecting shafts 73. This reinforcing jig 52 may be connected with the connecting shafts 73. The reinforcing jig 52 and the connecting shafts 73 are adjustable in the vehicle height direction.

This practical example too can provide the same effects as the practical example of FIGS. 17 and 18, evidently. Especially, in this practical example, as shown in FIGS. 21 and 22, the connecting shaft 73 equipped with the connecting jig 53 on each side is clamped between the outside pillar mount member 72b fixed to the outside surface 2b of seatbelt fixing pillar 2 and the inside pillar mount member 72c fixed to the inside surface 2a of seatbelt fixing pillar 2, and the inside pillar mount members 762c confronting each other inside the vehicle are connected and reinforced by the length adjustable reinforcing jig 52. This structure improves the rigidity of the link mechanism 71 connecting the vehicle restraining jigs 12 with vehicle 1.

[Ninth Embodiment]

FIGS. 23~26 show a ninth embodiment. In this embodiment, the pair of vehicle restraining jigs 12 are replaced by a pair of vehicle restraining jigs 82 shorter than the vehicle restraining jigs 12, and the poles 10 are replaced by vehicle outside anchor devices or vehicle outside fixing devices 83 in the modes of the fourth to seventh embodiments.

Figure 23:
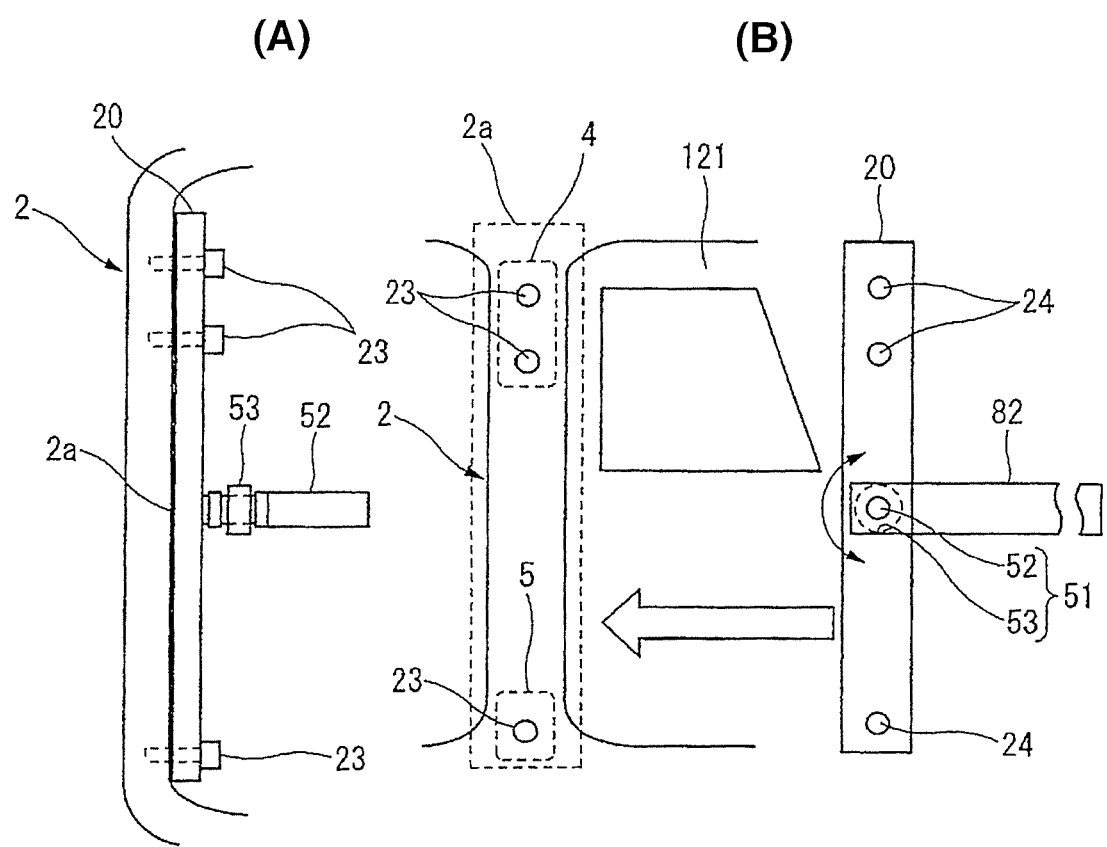
FIGS. 23(A) and 23(B) are views for illustrating one example of the mode of attaching the vehicle restraining jig to the seatbelt fixing pillar in a ninth embodiment.
Figure 24:
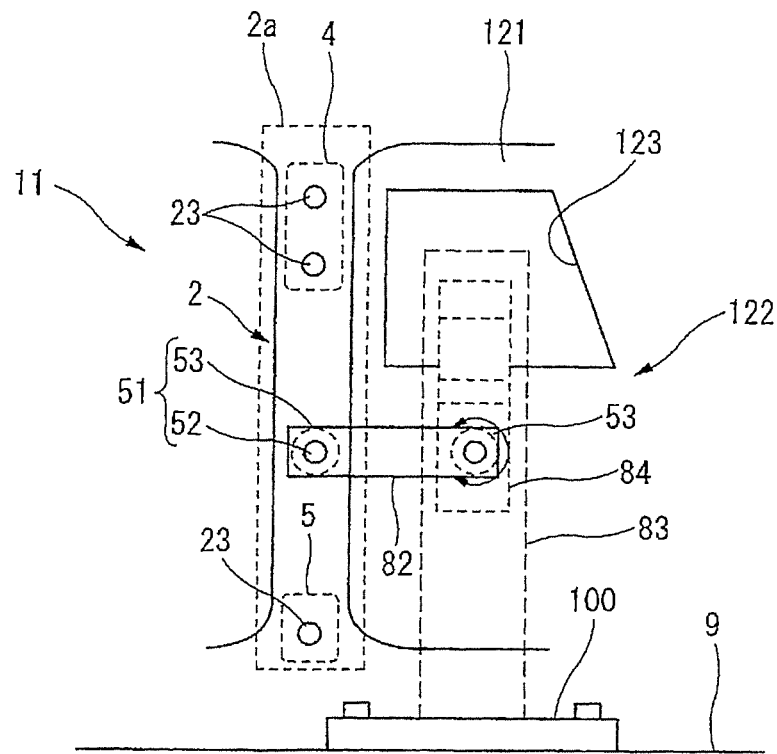
FIG. 24(A) is a view illustrating the state of the vehicle restraining jig attached to the seatbelt fixing pillar in the ninth embodiment.
FIG. 24(B) is a schematic side view of a vehicle restraint apparatus according to the ninth embodiment, provided with a test vehicle.
Figure 24:
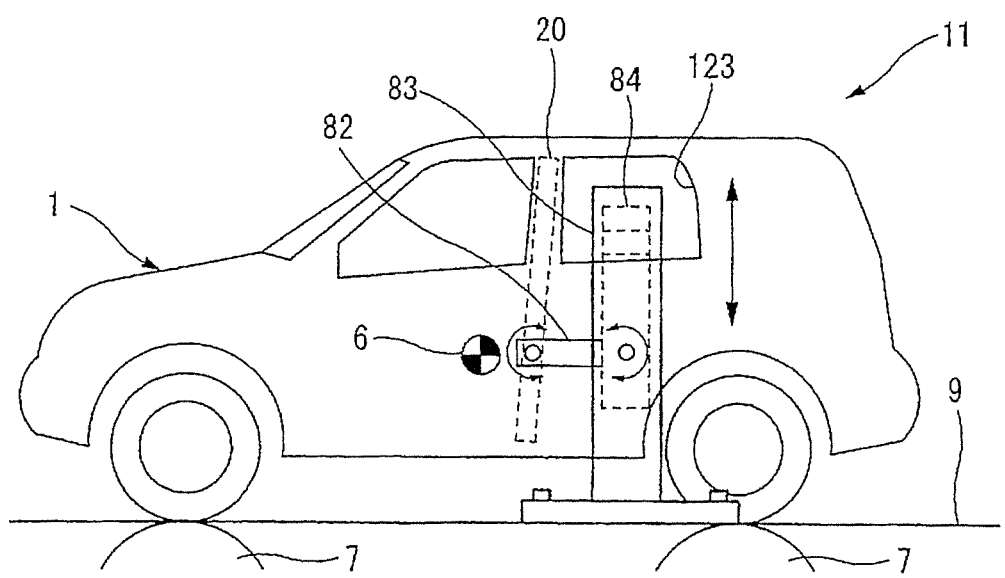

As shown in FIGS. 23 and 24, the first ends of left and right vehicle restraining jigs 82 are connected with the link mechanism 51 at pillar mount members 20 attached to the inside surfaces 2a of left and right seatbelt fixing pillars 2 of vehicle 1 having rear seat doors 121, and the second ends of vehicle restraining jigs 82 are connected with a link mechanism 84 disposed in a rear seat interior space 122 of vehicle 1.

The reinforcing jig 52 of link mechanism 51 is adjustable to adjust the position of reinforcing jig 52 at the pillar mount members 20, in the vehicle height direction. The explanation on the constructions and functions of link mechanism 51 and the connecting jigs 53 included in link mechanism 51 are omitted because the constructions and functions of link mechanism 51 and the connecting jigs 53 are explained before in the forth embodiment with reference to FIG. 10.

The vehicle outside anchor devices 83 are disposed, in a pair, on the floor 9, near the left and right rear seat doors 121 of vehicle 1, respectively, and arranged to support the link mechanism 84 through the openings 123 of rear seat doors 121.

Figure 25:
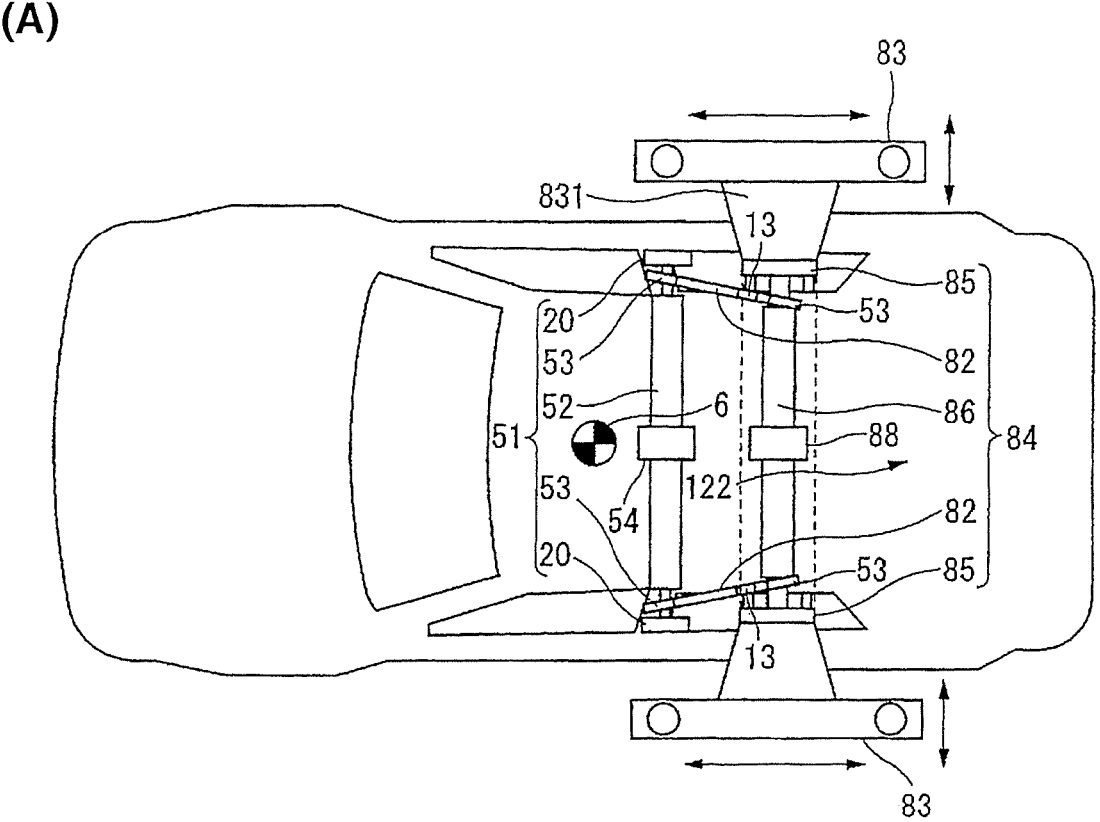
FIGS. 25(A) and 25(B) are schematic side view and schematic rear view of a vehicle restraint apparatus according to the ninth embodiment, provided with a test vehicle.
Figure 25:
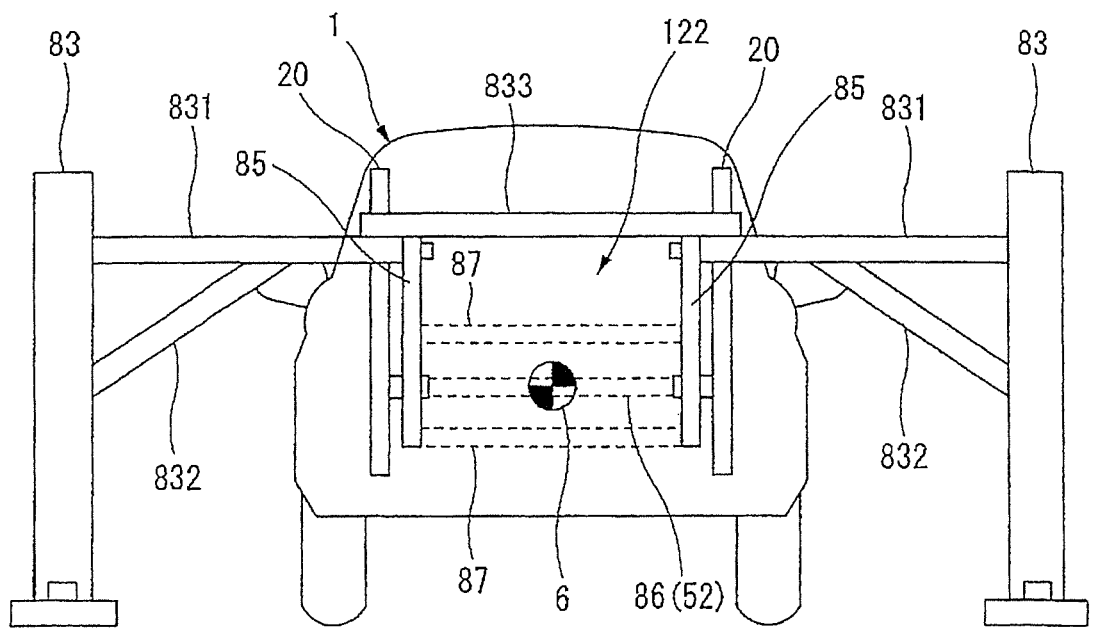

As shown in FIG. 25, the link mechanism 84 includes left and right attaching members 85, a first reinforcing jig 86 and a pair of connecting jigs 53. The left and right attaching members 85 extend vertically and confront each other in the rear seat interior space 122 of vehicle 1 at the side of rear seat doors 121. The left and right attaching members 85 are supported by the vehicle outside anchor devices 83. The first reinforcing jig 86 connects and reinforces the left and right attaching members 85. The first reinforcing jig 86 is adjustable so that the length of first reinforcing jig 86 is adjustable. The connecting jigs 53 connect the second ends of vehicle restraining jigs 82 rotatably with portions near both ends of first restraining jig 86.

The first reinforcing jig 86 is attached to the left and right attaching members 85 confronting each other inside the vehicle 1, in the adjustable manner enabling the adjustment of the position of first reinforcing jig 86 in the vehicle height direction. Near one end of first reinforcing jig 86, a pillow ball 55 (FIG. 10) of connecting jig 53 is preliminarily attached and fixed. The left and right attaching members 85 confronting each other are further reinforced secondarily by second reinforcing jig(s) 87 provided therebetween.

The vehicle outside anchor devices 83 include left and right support members 831 supporting the left and right attaching members of link mechanism 84 upright in vehicle 1, respectively. The two support members 831 are supported horizontally by horizontal supporting members 832 included in the main bodies of vehicle outside anchor devices 83, respectively, and connected by a connecting reinforce member 833 connecting and reinforcing the left and right support members 831 stably. Like the poles 10 in the first to eighth embodiments, the vehicle outside anchor devices 83 are installed on the floor 9 in the adjustable manner capable of adjusting the positions in either of the vehicle width direction, vehicle length direction and vehicle height direction.

The vehicle restraint apparatus 11 according to this embodiment is used in the following manner, for example, as shown in FIGS. 23~25.

First, the pillar mount members 20 of the first link mechanism 51 including the connecting jigs 53 connected with the first ends of vehicle restraining jigs 82 are attached to the inside surfaces 2a of seatbelt fixing pillars 2, respectively. Accordingly, the vehicle restraining jigs 82 are connected rotatably in the omnidirectional manner rearwards in vehicle 1, in the vicinity of the vehicle gravity center 6. Next, the second ends of vehicle restraining jigs 872 are connected with the connecting jigs 53 of link mechanism 84 supported in the rear seat interior space 122, at the height substantially equal to the height of vehicle gravity center 6. Then, the lengths of vehicle restraining jigs 82 are adjusted with length adjusting mechanisms 13, and the positions of vehicle outside anchor devices 83 are adjusted in the vehicle width direction, the vehicle length direction and/or the vehicle height direction. After vehicle 1 is thus restrained, the rollers 7 of chassis dynamometer are rotated and various tests of vehicle 1 are performed.

Therefore, the vehicle restraint apparatus 11 of this embodiment can restrain vehicle 1 securely and firmly like the vehicle restraint apparatus 11 of the sixth embodiment. Moreover, though the vehicle is restrained in the vehicle (translational) longitudinal motion, the vehicle (rotational) pitching motion and the vehicle (translational) up and down motion are set free. Therefore, the vehicle restraint apparatus according to this embodiment can realize the vehicle behavior with the vertical load approximate to the actual vertical load on a road.

Especially, this embodiment provides following effects in addition to the effects of the sixth embodiment. In the case of the test vehicle being of the type having rear seat doors 121, the link mechanism 84 connected with the second ends of vehicle restraining jigs 82 is supported by the vehicle outside anchor or fixing devices 83 through the openings 123 for the rear seat doors 121, so that it is possible to reduce the alteration of vehicle 1 to be tested.

Moreover, the reinforcing jig 52 and the first reinforcing jig 86 are attached to the members 20 and 85 for attachment, respectively, in the adjustable manner allowing the position adjustment in the vehicle height direction of vehicle 1. Therefore, it is possible to set the reinforcing jig 52 and first reinforcing jig 86 at desired positions at or near the level of the center of gravity 6 of vehicle 1 in accordance with the size of vehicle 1.

The second ends of vehicle restraining jigs 82 are connected with the portions of first reinforcing jig 86 at or near both ends of first reinforcing jig 86 through the connecting jigs 53. This structure can reduce the load factor of the moment (torque) of vehicle restraining jigs 82 to the first reinforcing jig 86, and thereby prevent deformation of first reinforcing jig 86 and related deformation and breakage of pillar attaching members 85.

The length-adjustable second reinforcing jig 87 further reinforcing the left and right attaching members 85 auxiliary can reinforce the pillar attaching members 85 and simultaneously support the first reinforcing jig 86 more stably.

Figure 26:
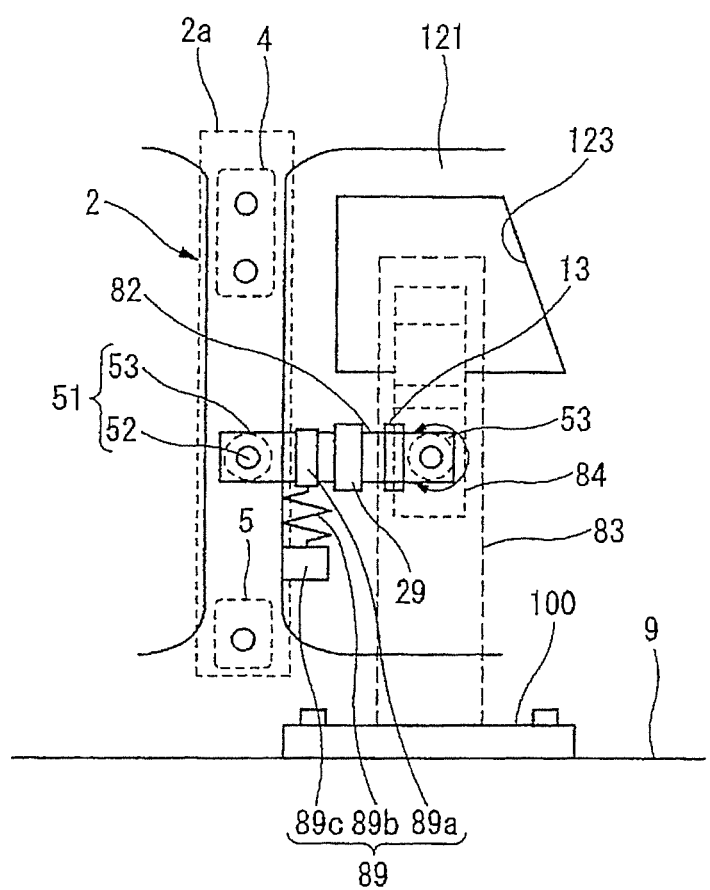
FIG. 26 is a view illustrating the state of the vehicle restraining jig attached to the seatbelt fixing pillar in the ninth embodiment.

Furthermore, as shown in FIG. 26, the vehicle restraining jig(s) 82 may be provided with the restraining force sensor 29, as in the fifth embodiment. In this practical example, the apparatus can sense the restraining force of the vehicle, and hence obtain the measurement signal of the restraining force of vehicle 1 in the longitudinal direction or front and rear direction.

Furthermore, as shown in FIG. 26, the vehicle restraining jig(s) 82 may be provided with a vibration damping device 89 to attenuate characteristic vibration of jig(s) 82. As the vibration damping device 89, it is possible to employ a known vibration damping device attached to vehicle restraining jig 12, 82 in a non-concentric manner or a non-coaxial manner.

The vibration damping device 89 includes an attachment member 89a attached to the vehicle restraining jig 82 detachably, an elastic member 89b, such as rubber, spring, connected detachably with the member 89a, and a weight or plumb 89c connected detachably with the member 89b.

In the practical example of FIG. 26, the vibration damping device 89 attenuates vibration of the vehicle restraining jig 82 produced at the time of test of vehicle 1. Therefore, the restraining sensor 29 can sense the restraining force with reduced influence of the vehicle restraining jig 82.

[Tenth Embodiment]

Figure 27:
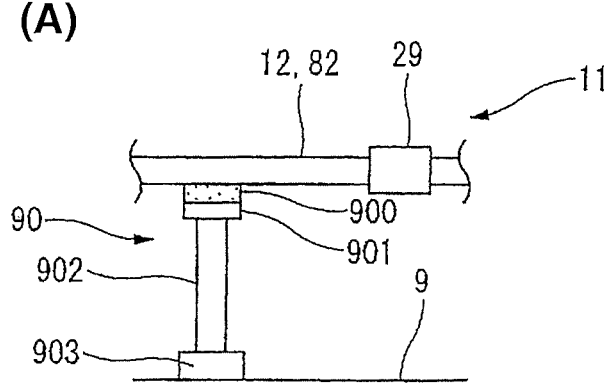
FIGS. 27(A) and 27(B) are schematic side view and vertical sectional view of a deflection absorbing mechanism according to a tenth embodiment.
Figure 27:
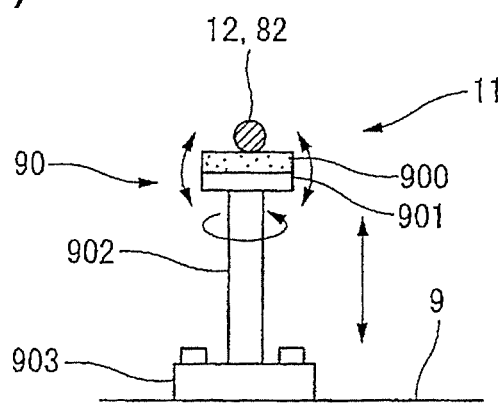
Figure 28:
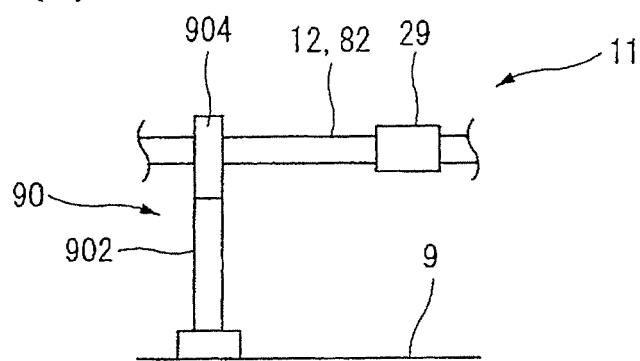
FIGS. 28A and 28(B) are schematic side view and vertical sectional view of a deflection absorbing mechanism according to the tenth embodiment.
Figure 28:
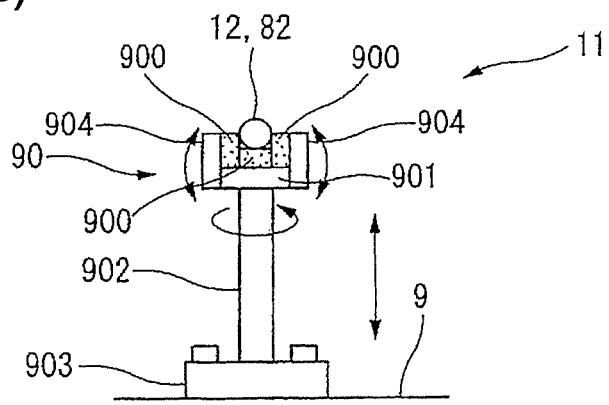

FIGS. 27 and 28 show a tenth embodiment. The vehicle restraint apparatus of this embodiment includes a deflection absorbing mechanism(s) 90 to absorb deflection or bending of the vehicle restraining jig(s) 12 or 82 produced at the time of test of the vehicle 1 with the chassis dynamometer in any one of the first to ninth embodiments.

The deflection absorbing mechanism 90 shown in FIG. 27 includes a jig receiving section 901 including a buffer or cushioning material 900 abutting elastically on the vehicle restraining jig deflected in the direction of gravity at the time of the tests, and a prop or column section 902 supporting the jig receiving section 901 rotatably in the horizontal direction or the vertical direction. As the buffer 900, it is possible to use a thick plate of known elastic material such as polyethylene.

The prop section 902 stands upright on a base section 903 placed on the floor 9 in the adjustable manner allowing the adjustment of the position in any of the vehicle width direction, vehicle length direction and vehicle height direction of vehicle 1.

This embodiment can absorb shock of the vehicle restraining jig(s) 12 or 82 deflecting in the direction of gravity at the time of testing of vehicle 1 with the chassis dynamometer, with the buffer(s) 900 of the deflection absorbing mechanism 90, in addition to the effects of the first to ninth embodiments.

Even if the vehicle restraining jigs 12 or 82 are deflected due to hard deceleration of vehicle 1 in a brake operation test, for example, the buffers 900 of the jig receiving sections 901 can absorb the deflection, and thereby the deflection absorbing mechanism can reduce influence on a measurement signal of the restraining force of the restraining force sensor 29. Furthermore, the deflection absorbing mechanism can prevent damage caused by buckling of the vehicle restraining jigs 12 or 82.

Especially, the jig receiving sections 901 are disposed below the vehicle restraining jigs 12 or 82 (in the direction of gravity) and arranged to rotate in the horizontal direction or the vertical direction. Therefore, the jig receiving sections can absorb deflection of the vehicle restraining jigs 12 or 82 from any direction.

As shown in FIG. 28, the jig receiving section 901 may be provided with a pair of stopper portions 904 each having a buffer 900 abutting elastically against the vehicle restraining jig deflected in the horizontal direction. In this practical example, impact of the vehicle restraining jig 12 or 82 deflecting in the direction of gravity and the vehicle width direction can be absorbed securely by the buffers 900 of stopper portions 904. Therefore, the deflection absorbing mechanism makes it possible to obtain the measurement signal of the restraining force sensor 29 under further reduced influence of the vehicle restraining jig 12 or 82. Furthermore, the deflection absorbing mechanism can prevent damage caused by buckling of the vehicle restraining jigs 12 or 82.

Figure 29:
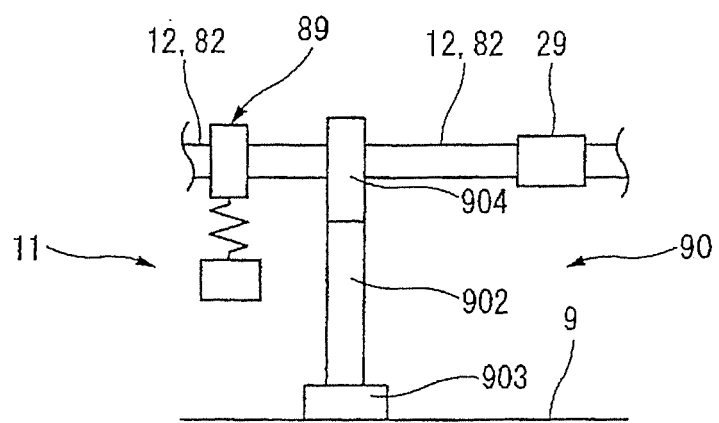
FIG. 29 is a view for illustrating the state of the deflection absorbing mechanism and a vibration damping device attached to the vehicle restraining jig.

As shown in FIG. 29, in this embodiment too, the vibration damping device(s) 89 may be attached detachably to the vehicle restraining jig(s) 12 or 82 as in the ninth embodiment. In the practical example, the vibration damping device 89 attenuates vibration of the vehicle restraining jig 82 produced at the time of test of vehicle 1. Therefore, the restraining sensor 29 can sense the restraining force with further reduced influence of the vehicle restraining jig 82.

[Eleventh Embodiment]

Figure 30:
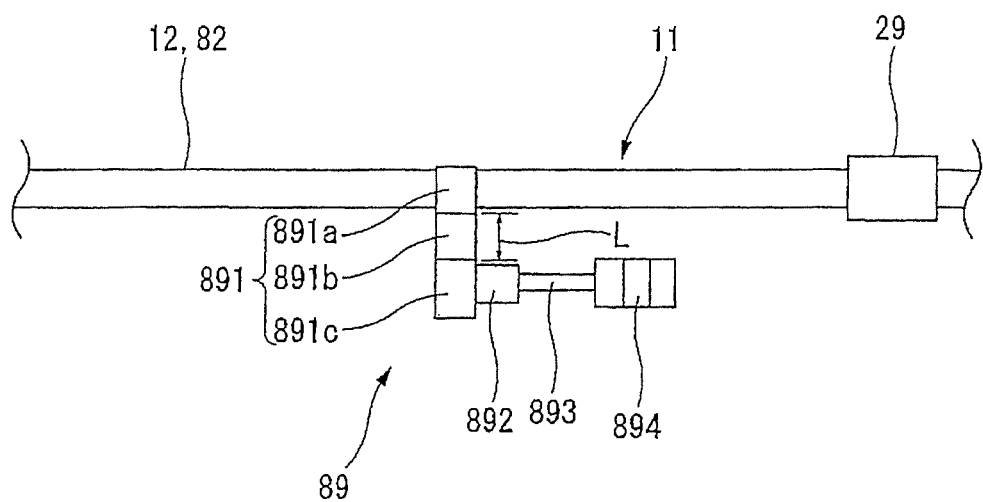
FIGS. 30(A) and 30(B) are schematic side views of a vibration damping devices according to an eleventh embodiment.
Figure 30:
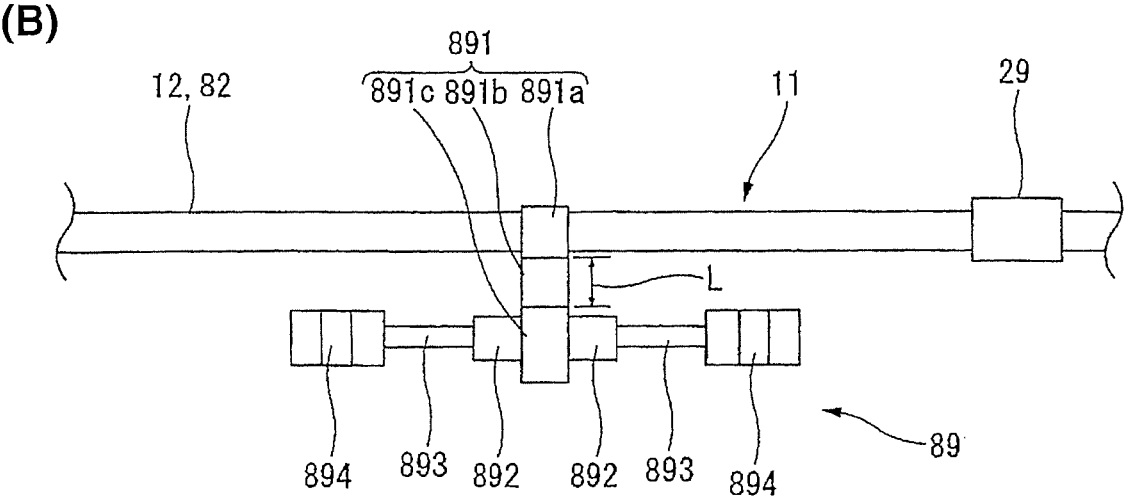

FIG. 30 shows an eleventh embodiment. The vehicle restraint apparatus 11 according to this embodiment includes vibration damping device(s) 89 to damp characteristic vibration of the vehicle restraining jig(s) 12 or 82 produced at the time of test of the vehicle 1 with the chassis dynamometer in any one of the first to tenth embodiments.

As the vibration damping device 89, it is possible to employ a vibration damping device attached detachably to the vehicle restraining jig 12 or 82 in a non-concentric manner or a non-coaxial manner, as shown in FIG. 30.

The vibration damping device 89 shown in FIG. 30(A) includes an attachment member or attaching member 891 attached to the vehicle restraining jig 12, 82 detachably, an elastic member 892 connected detachably with an outer side surface of a lower end portion 891c of the attachment member 891, a shank portion or shaft portion 893 which includes a first end connected detachably with the elastic member 892 and which is adjustable in length, and a weight portion 894 which is connected detachably with a second end of the shank portion 893 and which is adjustable in weight.

The attachment member 891 includes an upper end portion 891a attached detachably to the vehicle restraining jig 12, 82, a main portion 891b attached detachably to the upper end portion 891a, and the lower end portion 891c attached detachably to the main portion 891b.

The main portion 891b is rotatable, in an omnidirectional manner, about the upper end portion 891a (about the position at which the upper end portion 891a is attached to the vehicle restraining jig 12, 82), in an omnidirectional manner for all directions. To enable the omnidirectional rotation, the upper end portion 891 is provided with a pillow ball, for example, at the upper end.

The main portion 891b is detachable from upper end portion 891a, so that it is possible to select an appropriate one of main portions 891b having different lengths. The change of main portion 891b is not required when the main portion 891b is provided with a length adjusting mechanism.

The lower end portion 891c is rotatable in the horizontal direction. For example, the lower end portion 891c is formed with an internally threaded portion into which the lower end of main portion 891b is screwed, so that the lower end portion 891c is rotatable in the horizontal direction.

As the elastic member 892, it is possible to use an elastic or resilient member such as elastic rubber or coil spring used in a well-known anti-vibration damper. As the shank portion 893, it is possible to employ a length adjustable screw shaft screwed into the elastic member 892, for example. As the weight portion 894, it is possible to use a dividable weight of a known shape, attached to the shank portion 893 by means of thread engagement, for example.

In this embodiment, the vibration damping device 89 can attenuate characteristic vibration of each vehicle restraining jig 12, 82 produced at the time of test of vehicle 1, in addition to the effects of the first to tenth embodiments. Therefore, the restraining force sensor 29 can sense the restraining force with reduced influence of the vehicle restraining jigs.

For example, even in the case of hard acceleration/deceleration of vehicle 1 under test, the vibration damping devices 89 reduce the damping rate of characteristic or natural vibration of the vehicle restraining jigs 12, 86, and reduce the time of amplitude, so that the apparatus can restrain influence on the measurement signal of restraining force sensors 29.

Patent documents 4~7 disclose conventional vibration damping devices to attenuate natural vibration of a rod-shaped member. These vibration damping devices are designed to attenuate natural vibration of a rod-shaped member having one end set free, and arranged to be attached to the rod-shaped member concentrically or coaxially. Therefore, in the case of a rod-like member, such as vehicle restraining jigs 12, 82, having both ends fixed, these vibration damping devices are inadequate for suppressing natural vibration of the rod-like member since the change of weights for adjusting the damping rate is difficult.

By contrast, each vibration damping device 89 is so arranged that vibration damping device 89 can be attached non-concentrically or non-coaxially at a position away from the vehicle restraining jig 12, 82 in a detachable manner allowing operations of attaching and removing the device to and from the vehicle restraining jig. Therefore, it is easy to attach the vibration damping device 89 to the rod-like member having both ends fixed, so that the adjustment of natural frequency is difficult. Moreover, the adjustment of weight of the weight portion 894 is possible even after the installment, and hence the adjustment of the natural vibration frequency and the damping rate of vehicle restraining jig 12, 82 is easy.

Especially, in the vibration damping device 89, the upper end portion 891a of attachment member 891 is detachable with respect to the vehicle restraining jig 12, 82; the main portion 891b is detachable with respect to upper end portion 891a; the lower end portion 891c is detachable with respect to main portion 891b, the elastic member 894 is detachable with respect to lower end portion 891c; the shank portion 893 is detachable with respect to elastic member 892; and the weight portion 894 is detachable with respect to shank portion 893. Therefore, it is possible arbitrarily and individually to set the attachment position of upper end portion 891a to vehicle restraining jig 12, 82, the lengths of main portion 891b, shaft portion 893 and elastic member 892, the elastic force of elastic member 892 and the weight of weight portion 894. Consequently, the vibration damping device 89 enables the flexible adjustment to the natural vibration frequency of vehicle restraining jig 12, 82. The above-mentioned effect of the adjustment is further increased by the lower end portion 891c arranged to be rotatable in the horizontal direction.

It is possible to employ a structure shown in FIG. 30(B). In this structure, a further elastic member 892 is additionally connected detachably to the lower end portion 891a of attachment member 891 at an outer side surface so that the further elastic member 892 confronts the existing elastic member 892. Moreover, in this structure, a length adjustable shank portion 893 is connected detachably with this elastic member 892, and a weight adjustable weight portion 894 is detachably connected with this shank portion 893. This practical example expands the range of adjustment of the natural vibration frequency and damping rate of vehicle restraining jigs 12, 82.

The vibration damping devices 89 are arranged to damp vibration of vehicle restraining jigs 12, 18 in the examples explained above. However, the object to be damped is not limited to the vehicle restraining jigs 12, 82. The vibration damping device according to the present invention is applicable also to rod-like members undergoing vibrations, to attenuate the natural vibration of the rod-like members.

[Twelfth Embodiment]

Figure 31:
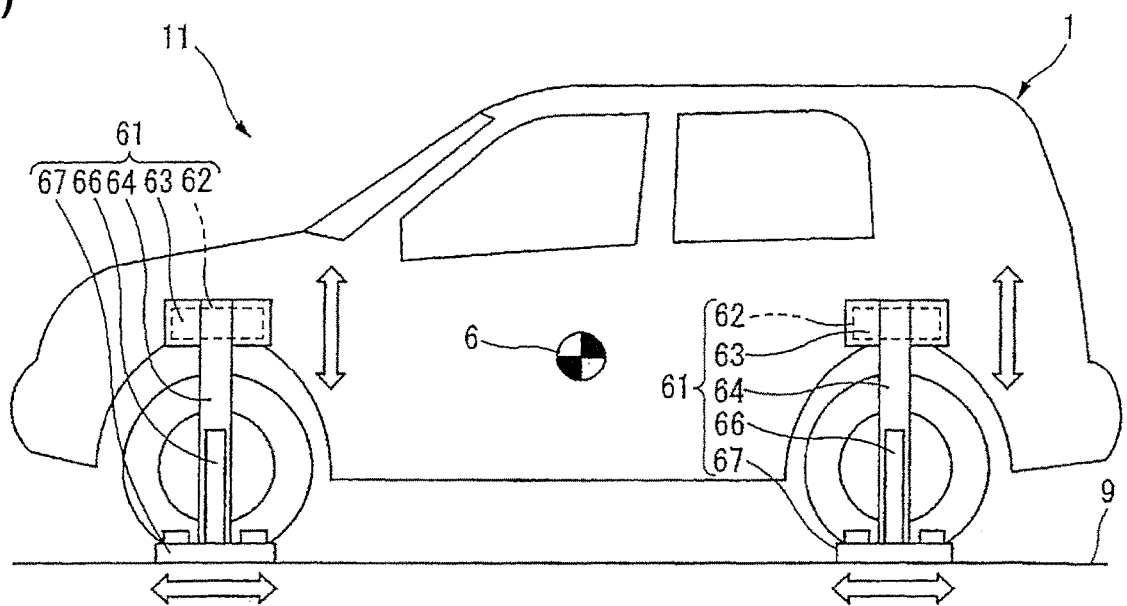
FIGS. 31(A) and 31(B) are schematic side view and schematic plan view of a lateral vibration suppressing mechanism in a vehicle restraint apparatus according to a twelfth embodiment with a test vehicle.
Figure 31:
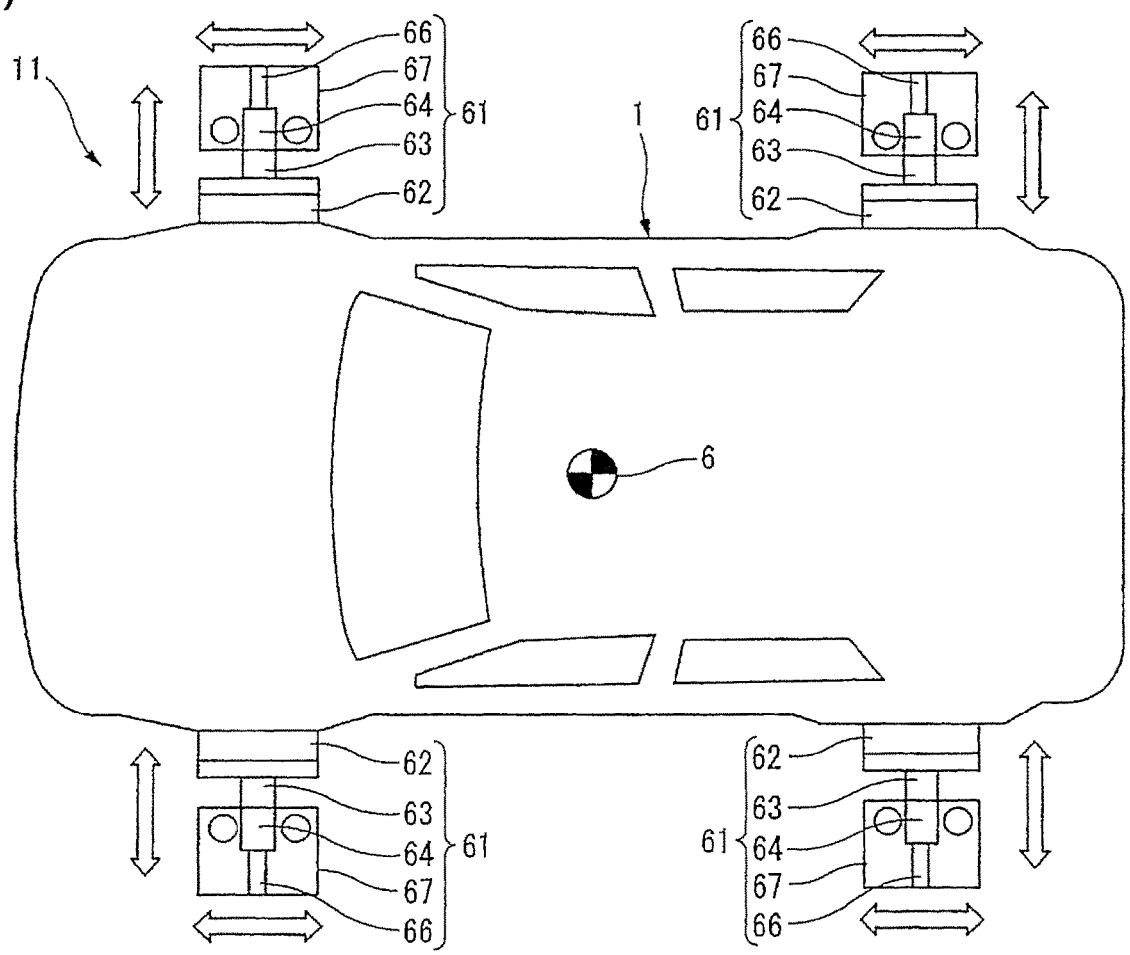
Figure 32:
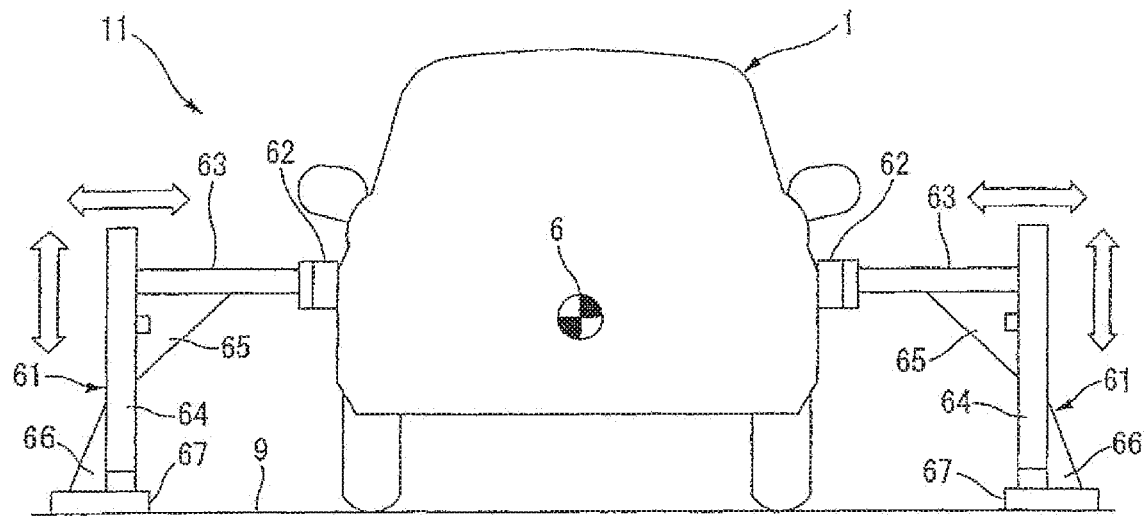
FIG. 32 is a schematic rear view of the lateral vibration suppressing mechanism according to the twelfth embodiment.
Figure 33:
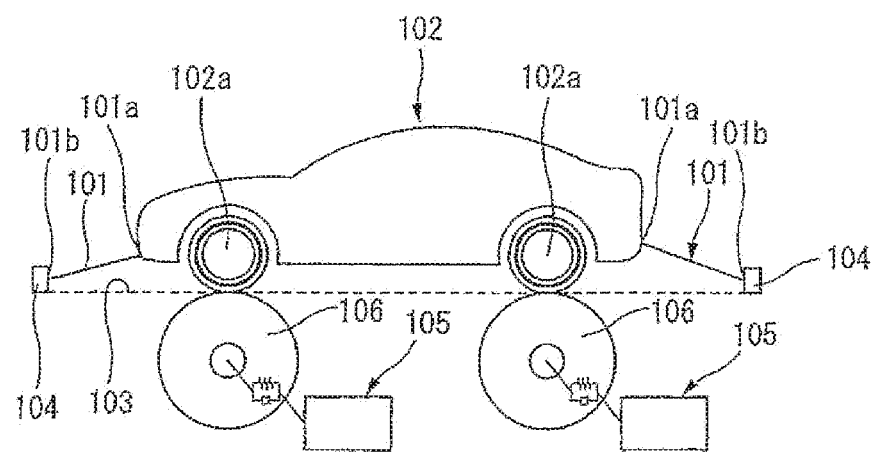
FIG. 33 is a view for illustrating a conventional example.
Figure 34:
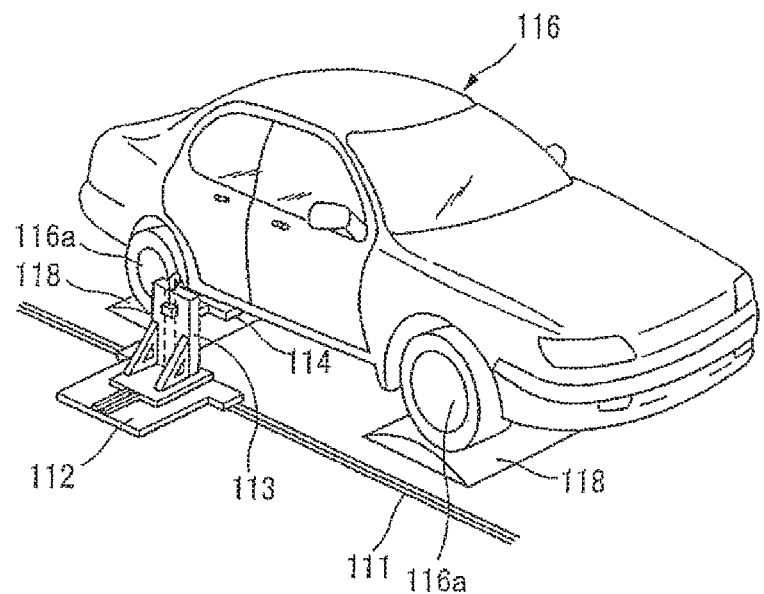
FIG. 34(A) is a perspective view showing another conventional example.
FIG. 34(B) is a sectional view showing an adapter and an adapter receiving portion of the vehicle restraint apparatus.
Figure 34:
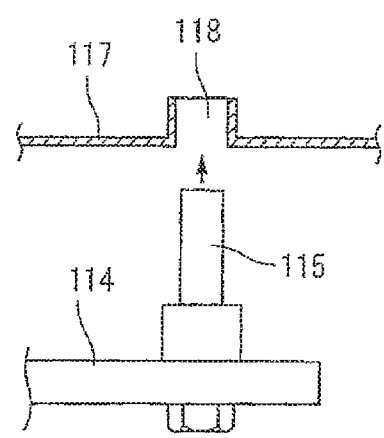

FIGS. 31 and 32 show a twelfth embodiment. The vehicle restraint apparatus 11 according to this embodiment further includes a lateral vibration suppressing mechanism 61 to suppress lateral vibration of the vehicle 1 produced at the time of test of the vehicle 1 with the chassis dynamometer, in any one of the first to eleventh embodiments.

Two of the lateral vibration suppressing mechanisms 61 are disposed on the left and right sides, at the positions of the front wheels of vehicle 1, and two of the lateral vibration suppressing mechanisms 61 are disposed on the left and right sides at the positions of the rear wheels of vehicle 1. Especially, in the case of the fourth and fifth embodiments, these lateral vibration suppressing mechanisms 61 are disposed so as to avoid interference with the vehicle restraining jigs 12.

Each of the lateral vibration suppressing mechanisms 61 includes a buffer member or cushioning member 62 abutting elastically on the main body of vehicle 1, a support member 63 supporting the buffer 62 in an adjustable manner to adjust the position of buffer 62 in the width direction of vehicle 1, and a pillar portion 64 to which the support member 63 is attached.

The buffer member 62 is filled with sponge or air balls. The support member and pillar portion 64 are made of material having tensile strength and compression strength required to suppress the side force of vehicle 1, such as steel or other material superior in the mechanical strength in the form of sheet or pipe like the vehicle restraining jigs 12.

The support member 63 is supported in a horizontal state, by a brace member or horizontal support member 65 fixed to the pillar portion 64, as shown in FIG. 32. The pillar portion 64 is supported upright on a base 67 placed fixedly on the floor 9, by an upright support member 66 in the adjustable manner to enable the position adjustment in any of the vehicle width direction, vehicle length direction and vehicle height direction of vehicle 1.

With the lateral vibration suppressing mechanisms 61, the vehicle restraint apparatus 11 according to this embodiment can suppress lateral vibration (side force) of vehicle 1 produced at the timer of test of vehicle 1 with the chassis dynamometer, in addition to the effects of the first to eleventh embodiments. By so doing, this vehicle restraint apparatus can suppress motion of vehicle 1 other than the pitching motion and up and down motion.

As the vehicle restraint apparatus in the chassis dynamometer, besides the vehicle restraint apparatus disclosed in Patent Documents 1~3, Patent Documents 8 and 9 show vehicle fixing apparatus. The vehicle fixing apparatus of Patent Document 8 includes fixing units fixing a test vehicle at positions corresponding to the four corners of the test vehicle. The vehicle fixing apparatus of Patent Document 9 includes front and rear stopper bars fixing the front and rear ends of a test vehicle and side pressing portions fixing the left and right sides of the vehicle.

However, the vehicle fixing apparatus of Patent Documents 8 and 9 are arranged to fix the test vehicle on the front and rear sides and left and right side almost completely, so that the vehicle pitching motion tends to be restrained too much beyond the requirement. Therefore, these vehicle fixing apparatus are unable to reproduce the vehicle behavior simulating the behavior on the road as intended, in some cases, like the apparatus of Patent Documents 1~3.

By contrast, the vehicle restraint apparatus 11 according to this embodiment including the vehicle restraining jigs in one of the first to eleventh embodiments, and the lateral vibration suppressing mechanisms 61 can suppress the side or lateral forces of vehicle 1 produced at the time of test of vehicle 1 while setting the vehicle pitching motion free, and thereby achieve the vehicle behavior including the vertical load simulating the actual behavior on the road more effectively.

Furthermore, the arrangement including the four lateral vibration suppressing mechanisms 61 disposed in a pair at the left and right front wheel positions and in a pair at the left and right rear wheel positions can suppress the lateral vibration of vehicle 1 at the portions around the left and right front fenders and the left and right rear fenders of vehicle 1. Therefore, the operation is feasible without interference with a discharge port of a cooling fan for cooling an engine of vehicle 1, generally disposed at a front part of vehicle 1. Moreover, without interference with the opening/closing operations of the doors of vehicle 1, it is possible to reduce the time for preparation by setting measuring devices in vehicle 1.

Furthermore, the buffer members 62 of the lateral vibration suppressing mechanisms 61 abut elastically or resiliently on the body of vehicle 1, and thereby reduce influence impeding the vehicle pitching motion. Moreover, because the positions of the buffer members 62 are adjustable by the support members 63 in the width direction of vehicle 1, it is possible to set the positions of buffer members 62 desirably in dependence on the width of vehicle 1.

The pillar portions 64 are adjustable in any of the vehicle width direction, vehicle length direction and vehicle height direction. Therefore, it is it is possible to set the positions of buffer members 62 desirably in dependence on the vehicle width, vehicle length and vehicle height of vehicle 1.

The invention claimed is:

1. A vehicle test and restraint system comprising:
   one or more rollers for supporting a vehicle;
   a pole on a floor;
   a vehicle restraining jig to connect the vehicle with the pole on the floor; and
   a deflection absorbing mechanism to absorb deflection of the vehicle restraining jig produced at a time of a vehicle test with a vehicle test system;
   wherein the deflection absorbing mechanism comprises:
      a jig receiving section including a first buffer abutting elastically on the vehicle restraining jig deflected in a direction of gravity; and
      a prop section supporting the jig receiving section rotatably about a horizontal axis, which extends along the jig receiving section;
   wherein the jig receiving section is arranged to rotate about the horizontal axis;
   wherein the first buffer is located between the vehicle restraining jig and the prop section; and
   wherein the deflection absorbing mechanism is arranged to absorb the deflection of the vehicle restraining jig which is extended, at the time of the vehicle test, horizontally from a first end connected with the vehicle to a second end connected with the pole such that the vehicle restraining jig is held substantially horizontal, and the pole stands upright on the floor.

2. The vehicle test and restraint system as recited in claim 1, wherein the jig receiving section is rotatable about the horizontal axis and a vertical axis.

3. The vehicle test and restraint system as recited in claim 1, wherein the jig receiving section further includes a pair of stopper portions each including a second buffer abutting elastically on the vehicle restraining jig deflected in a horizontal direction.

4. The vehicle test and restraint system as claimed in claim 3, wherein the stopper portions of the jig receiving section are positioned on both sides of the vehicle restraining jig and the second buffers of the stopper portions confront each other across the vehicle restraining jig located between the second buffers of the stopper portions.

5. The vehicle test and restraint system as recited in claim 1, wherein the prop section is disposed on the floor in an adjustable manner enabling position adjustment in at least one of a vehicle width direction, a vehicle length direction or a vehicle height direction.

6. The vehicle test and restraint system as recited in claim 1, further comprising a vibration damping device which is attached to the vehicle restraining jig detachably, and which is arranged to attenuate vibration of the vehicle restraining jig produced at a time of test of the vehicle with the vehicle test system.

7. The vehicle test and restraint system as recited in claim 6, wherein the vibration damping device comprises:
an attachment member attached to the vehicle restraining jig detachably,
an elastic member attached detachably to an outer side surface of a lower end portion of the attachment member,
a shank portion having a first end attached to the elastic member detachably, and
a weight portion which is attached to a second end of the shank portion detachably and which is adjustable in weight.

8. The vehicle test and restraint system as recited in claim 1, wherein the vehicle restraining jig includes left and right restraining jigs having first ends joined rotatably with left and right seatbelt fixing pillars of the vehicle and second ends joined rotatably with left and right poles on the floor.

9. The vehicle test and restraint system as recited in claim 8, wherein the first ends of the left and right restraining jigs are joined directly and rotatably with the left and right seatbelt fixing pillars of the vehicle, respectively.

10. The vehicle test and restraint system as recited in claim 8, wherein the first end of the left vehicle restraining jig is arranged to grip an intermediate portion of the left seatbelt fixing pillar which extends vertically from a lower end to an upper end, through the intermediate portion located between the lower end and the upper end of the left seatbelt fixing pillar, and the first end of the right vehicle restraining jig is arranged to grip an intermediate portion of the right seatbelt fixing pillar which extends vertically from a lower end to an upper end, through the intermediate portion located between the lower end and the upper end of the right seatbelt fixing pillar.

11. The vehicle test and restraint system as recited in claim 8 wherein the first ends of the left and right vehicle restraining jigs are joined, respectively, with the left and right seatbelt fixing pillars at a height substantially equal to a height of a center of gravity of the vehicle, and the second ends of the left and right vehicle restraining jigs are joined, respectively, with the left and right poles at a height substantially equal to the height of the center of gravity of the vehicle.

12. The vehicle test and restraint system as claimed in claim 1, wherein the first buffer of the jig receiving section is located below the vehicle restraining jig at an intermediate position between the first and second ends of the vehicle restraining jig and arranged to receive the vehicle restraining jig at the intermediate position when the vehicle restraining jig is deflected downwards.

13. The vehicle test and restraint system as recited in claim 1, wherein the prop section stands upright on the floor and the jig receiving section is mounted on an upper end of the prop section and located between the prop section just below the jig receiving section and the vehicle restraining jig just above the jig receiving section.

14. The vehicle test and restraint system as recited in claim 1, wherein the vehicle restraining jig includes an intermediate portion located between the first and second ends of the vehicle restraining jig and extends longitudinally from the first end coupled to a vehicle body of the vehicle at a front position, through the intermediate portion, to the second end coupled to the pole at a rear position, and the deflection absorbing mechanism including the jig receiving section and the prop section is disposed just below the intermediate portion of the vehicle restraining jig and arranged to receive the intermediate portion of the vehicle restraining jig when the vehicle restraining jig supported at both ends is deflected at the intermediate portion in the direction of gravity and the intermediate portion sags down by deflection of the vehicle restraining jig in the direction of gravity.

15. The vehicle test and restraint system as claimed in claim 1, wherein the jig receiving section of the deflection absorbing mechanism is arranged to allow the vehicle restraining jig to move freely in a longitudinal direction of the vehicle restraining jig without imposing limitation on movement of the vehicle restraining jig in the longitudinal direction of the vehicle restraining jig, and arranged to allow the vehicle restraining jig to move in an upward direction without imposing limitation on movement of the vehicle restraining jig in the upward direction.

16. The vehicle test and restraint system as claimed in claim 15, further comprising a length adjusting mechanism configured to adjust a length of the vehicle restraining jig between the first and second ends of the vehicle restraining jig.

17. The vehicle test and restraint system as claimed in claim 15, further comprising a restraining force sensor configured to sense a restraining force of the vehicle restraining jig.

18. The vehicle test and restraint system as claimed in claim 1, wherein the jig receiving section includes a U-shaped part which has a U-shaped groove extending in a longitudinal direction of the vehicle restraining jig, to receive the vehicle restraining jig and which is arranged to rotate about a vertical axis.

19. The vehicle test and restraint system as recited in claim 1, further comprising the vehicle, which is placed on the one or more rollers and connected with the pole by the vehicle restraining jig.

20. A vehicle test and restraint system comprising:
one or more rollers supporting a vehicle;
a pole on a floor;
a vehicle restraining jig configured to connect the vehicle with the pole on the floor; and
a deflection absorbing mechanism configured to absorb deflection of the vehicle restraining jig produced at a time of a vehicle test with a vehicle test system;
wherein the deflection absorbing mechanism comprises:
a jig receiving section including a buffer abutting elastically on the vehicle restraining jig deflected in a direction of gravity; and
a prop section supporting the jig receiving section rotatably about a horizontal axis, which extends along the jig receiving section;

wherein the jig receiving section is arranged to rotate about the horizontal axis;
wherein the buffer is located between the vehicle restraining jig and the prop section; and
wherein the deflection absorbing mechanism is arranged to absorb the deflection of the vehicle restraining jig which is extended, at the time of the vehicle test, rearwards from a front end connected with the vehicle to a rear end connected with the pole which is located on a rear side of the vehicle such that a rear end of the vehicle is located, in a longitudinal direction of the vehicle, between a front end of the vehicle and the pole.

21. The vehicle test and restraint system as claimed in claim 20, further comprising a restraining force sensor configured to sense a tension of the vehicle restraining jig between the front and rear ends of the vehicle restraining jig; and the jig receiving section of the deflection absorbing mechanism is arranged to prevent influence on the tension of the vehicle restraining jig by allowing the vehicle restraining jig to move in a longitudinal direction of the vehicle restraining jig freely without imposing limitation on movement of the vehicle restraining jig in the longitudinal direction of the vehicle restraining jig.

22. A vehicle test apparatus comprising:
a chassis dynamometer arranged to test a vehicle;
an external anchor device disposed on a floor of the vehicle test apparatus;
a vehicle restraining jig extending in a longitudinal direction of the vehicle placed on the chassis dynamometer from a front end coupled to a vehicle body of the vehicle at a front position, to a rear end coupled to the external anchor device at a rear position, thereby to restrain the vehicle body of the vehicle for vehicle testing, the vehicle restraining jig including an intermediate portion which is located at an intermediate position between the front end and the rear end of the vehicle restraining jig; and
a deflection absorbing mechanism disposed at the intermediate position under the intermediate portion of the vehicle restraining jig and arranged to absorb deflection of the vehicle restraining jig when the intermediate portion of the vehicle restraining jig is deflected in a direction of gravity at a time of a vehicle test, wherein the deflection absorbing mechanism comprises:
a prop section which is disposed at the intermediate position just below the intermediate portion of the vehicle restraining jig and which stands upright; and
a jig receiving section which is mounted on an upper end of the prop section and which includes a buffer abutting elastically on the intermediate portion of the vehicle restraining jig deflected in the direction of gravity, thereby to absorb the deflection of the vehicle restraining jig in the direction of gravity.

23. The vehicle test apparatus as claimed in claim 22, wherein:
the chassis dynamometer includes a first roller on which left and right front wheels of the vehicle to be tested are placed and a second roller on which left and right rear wheels of the vehicle to be tested are placed;
the external anchor device includes left and right anchor devices disposed on the floor of the vehicle test apparatus;
the vehicle restraining jig includes left and right restraining jigs to connect left and right portions of the vehicle body, respectively, with the left and right anchor devices; and
the deflection absorbing mechanism includes left and right absorbing devices to absorb deflection of the left and right restraining jigs, respectively.

24. The vehicle test apparatus as claimed in claim 22, wherein the prop section supports the jig receiving section rotatably about a horizontal axis, and the jig receiving section is arranged to rotate about the horizontal axis which extends along the vehicle restraining jig.

25. The vehicle test apparatus as claimed in claim 22, wherein the chassis dynamometer is arranged to support a front wheel of the vehicle at a predetermined front wheel position and to support a rear wheel of the vehicle at a predetermined rear wheel position which is spaced from the front wheel position in a predetermined front-and-rear direction;
wherein the external anchor device is located on a rear side of the rear wheel position at which the rear wheel of the vehicle is positioned;
wherein the vehicle restraining jig extends from the front end of the vehicle restraining jig at the front position to the rear end of the vehicle restraining jig at the rear position in a rearward direction extending from the front wheel position to the rear end position; and
wherein the front end of the vehicle restraining jig is located between the front wheel position and the rear wheel position in the front-and-rear direction, and the rear end of the vehicle restraining jig is located on the rear side of the rear wheel position so that the rear wheel position is located between the front wheel position and the rear position of the rear end of the vehicle restraining jig in the front-and-rear direction.

26. The vehicle test apparatus as claimed in claim 22, wherein the vehicle test apparatus comprises the vehicle which is placed on the chassis dynamometer, which includes the vehicle body extending from a front end of the vehicle body to a rear end of the vehicle body in the longitudinal direction of the vehicle and which includes a front wheel and a rear wheel; and the vehicle restraining jig extends from the front end coupled to the vehicle body of the vehicle at the front position between the front wheel and the rear wheel, in a rearward direction toward the rear end of the vehicle body, and further extends in the rearward direction to the rear end coupled to the external anchor device located on a rear side of the rear end of the vehicle body so that the rear end of the vehicle body is located between the front end of the vehicle body and the external anchor device in the longitudinal direction of the vehicle.

27. The vehicle test apparatus as claimed in claim 26, wherein the vehicle restraining jig extends from the front end of the vehicle restraining jig, to the rear end coupled to the external anchor device, horizontally at a level which is above a floor of the vehicle body of the vehicle placed on the chassis dynamometer, and which is substantially equal in height, to a center of gravity of the vehicle on the chassis dynamometer; and the front end of the vehicle restraining jig is coupled to a seatbelt fixing pillar of the vehicle body at the level which is substantially equal in height to the center of gravity of the vehicle.

28. The vehicle test apparatus as claimed in claim 26, wherein the vehicle restraining jig extends inside the vehicle body of the vehicle placed on the chassis dynamometer and projects from the rear end of the vehicle body, to the external anchor device.

29. The vehicle test apparatus as claimed in claim 26, wherein the vehicle test apparatus further comprises a length adjusting mechanism configured to adjust a length of the vehicle restraining jig between the front and rear ends of the vehicle restraining jig in accordance with a length of the vehicle.

30. The vehicle test apparatus as claimed in claim 22, wherein the jig receiving section of the deflection absorbing mechanism is open upwards and configured to allow the vehicle restraining jig to move upwards away from the jig receiving section and to allow the vehicle restraining jig to move back and forth freely in a longitudinal direction of the vehicle restraining jig.

31. The vehicle test apparatus as claimed in claim 30, wherein the vehicle test apparatus further comprises a restraining force sensor configured to sense a tension of the vehicle restraining jig between the front and rear ends of the vehicle restraining jig which connects the vehicle body with the external anchor device and pulls the vehicle body toward the external anchor device at the time of the vehicle test.

32. The vehicle test apparatus as claimed in claim 22, wherein the jig receiving section of the deflection absorbing mechanism is arranged to rotate about a horizontal axis extending along the vehicle restraining jig.

33. The vehicle test apparatus as claimed in claim 32, wherein the jig receiving section includes a U-shaped part which has a U-shaped groove extending along the vehicle restraining jig, to receive the vehicle restraining jig, and which is arranged to rotate about a vertical axis.

34. The vehicle test apparatus as claimed in claim 22, wherein the vehicle test apparatus comprises the vehicle which is placed on the chassis dynamometer, and which includes left and right seatbelt fixing pillars each extending from a lower end to an upper end; the external anchor device includes left and right anchor devices disposed on the floor of the vehicle test apparatus; the vehicle restraining jig includes left and right restraining jigs to connect left and right portions of the vehicle body, respectively, with the left and right anchor devices; wherein the deflection absorbing mechanism includes left and right absorbing devices to absorb deflection of the left and right restraining jigs, respectively; and the front ends of the left and right restraining jigs are located at a level substantially equal in height to a center of gravity of the vehicle, and coupled, respectively, with the left and right seatbelt fixing pillars at the level.

35. The vehicle test apparatus as claimed in claim 22, wherein the vehicle restraining jig is supported only at the front and rear ends of the vehicle restraining jig so that a downward deflection of the vehicle restraining jig is increased at a middle between the front and rear ends of the vehicle restraining jig, and the deflection absorbing mechanism is disposed to absorb the downward deflection of the vehicle restraining jig at a position where the downward deflection of the vehicle restraining jig is increased between the front and rear ends of the vehicle restraining jig.

* * * * *